Figure 1:
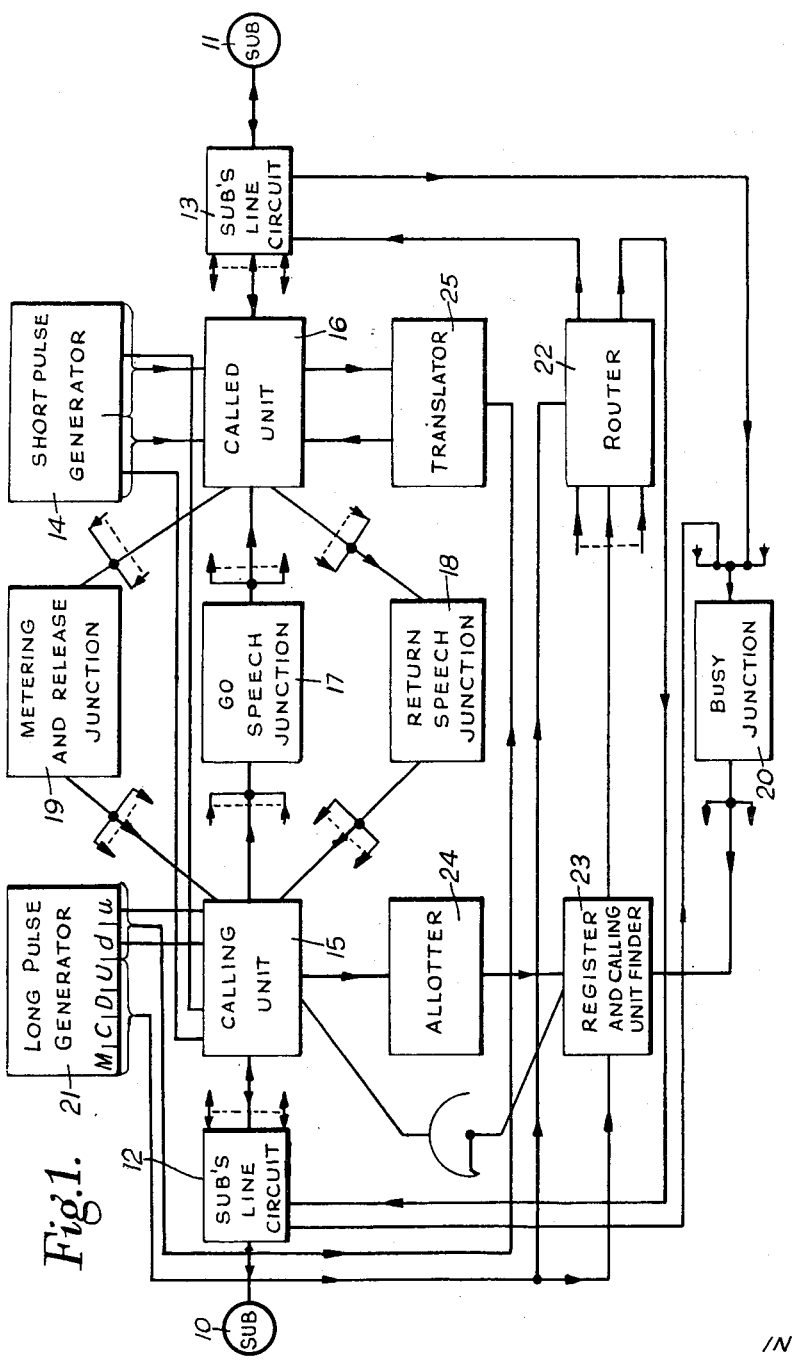

May 22, 1956     A. A. CHUBB ET AL     2,747,021

TELECOMMUNICATION SYSTEMS EMBODYING AUTOMATIC EXCHANGES

Filed Sept. 18, 1951     19 Sheets-Sheet 12

INVENTORS
ALEXANDER ALBERT CHUBB
MAURICE MOISE LEVY
BY
*ATTORNEY*

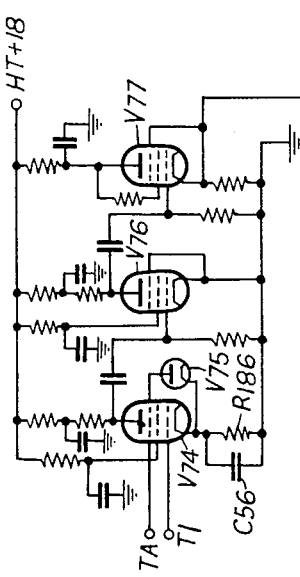
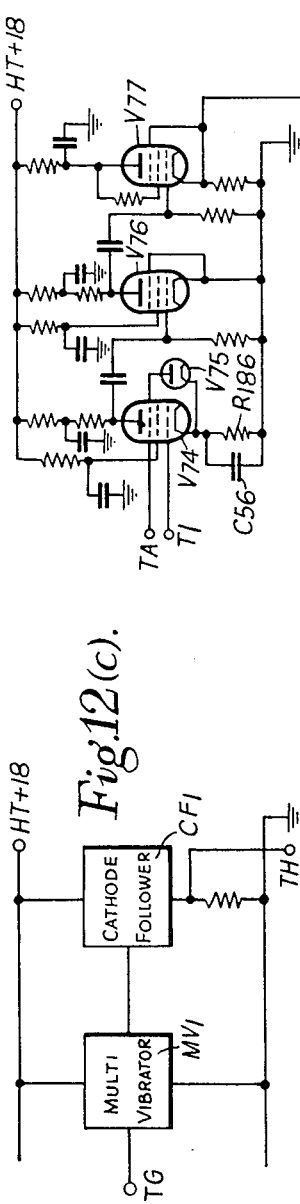
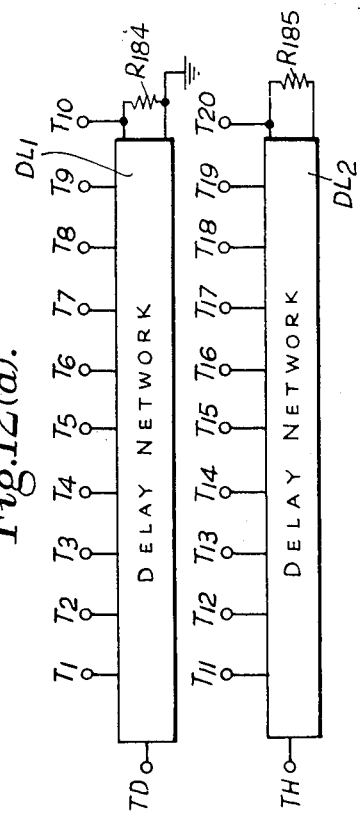

May 22, 1956  A. A. CHUBB ET AL  2,747,021
TELECOMMUNICATION SYSTEMS EMBODYING AUTOMATIC EXCHANGES
Filed Sept. 18, 1951  19 Sheets-Sheet 15

INVENTORS
ALEXANDER ALBERT CHUBB
MAURICE MOISE LEVY
BY
ATTORNEY

May 22, 1956  A. A. CHUBB ET AL  2,747,021
TELECOMMUNICATION SYSTEMS EMBODYING AUTOMATIC EXCHANGES
Filed Sept. 18, 1951  19 Sheets-Sheet 16

INVENTORS
ALEXANDER ALBERT CHUBB
MAURICE MOISE LEVY
BY
ATTORNEY

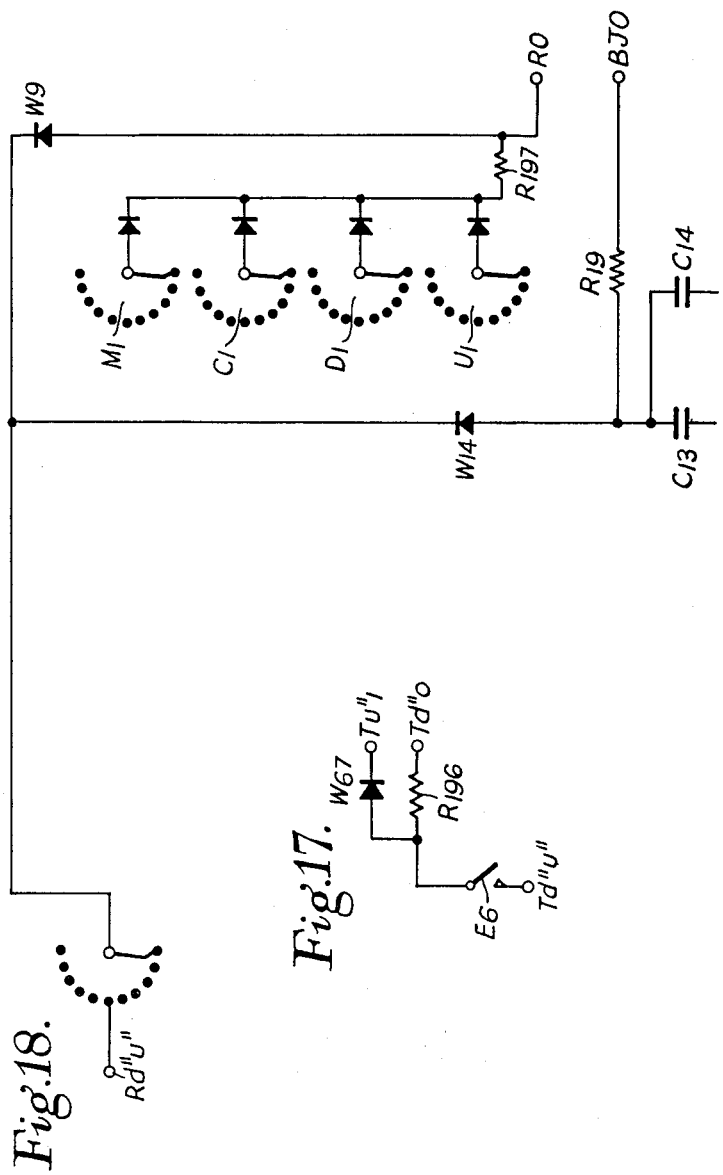

United States Patent Office 2,747,021
Patented May 22, 1956

2,747,021

TELECOMMUNICATION SYSTEMS EMBODYING AUTOMATIC EXCHANGES

Alexander Albert Chubb, Coventry, England, and Maurice Moise Levy, Ottawa, Ontario, Canada, assignors to The General Electric Company Limited, London, England Application September 18, 1951, Serial No. 247,072

Claims priority, application Great Britain September 21, 1950

9 Claims. (Cl. 179—18)

The present invention relates to telecommunication systems embodying automatic exchanges. Such systems are commonly used in telephony but may be used in other fields such as for example, telegraphy and remote metering.

In automatic exchange practice it is usual to employ automatic switching apparatus which performs the dual function of routing a calling signal from a calling subscriber to the called subscriber and subsequently providing the link through which conversation takes place.

A disadvantage of this arrangement arises from the fact that as the same automatic switching apparatus is used for providing the link through which conversations take place, as well as for calling the called subscribers, the major factors determining the quantity of automatic switching apparatus required at an exchange are the number of subscribers, the average number of calls in a given period (the calling rate) and the average duration of conversations. The average time taken to establish a call is a minor factor.

One object of the present invention is to provide an improved automatic exchange in which the average duration of conversation is a minor factor in determining the quantity of automatic switching apparatus required.

According to the present invention an automatic exchange comprises a plurality of communication channels, line terminating apparatus responsive to an initial calling signal from a calling station to select a free one of said channels, routing apparatus adapted, in response to dialling signals from the calling station to route to the line terminating apparatus of the called station an identification signal identifying the selected one of the channels, and further apparatus responsive to the channel identification signal to connect the called station to the selected channel.

Figure 2:
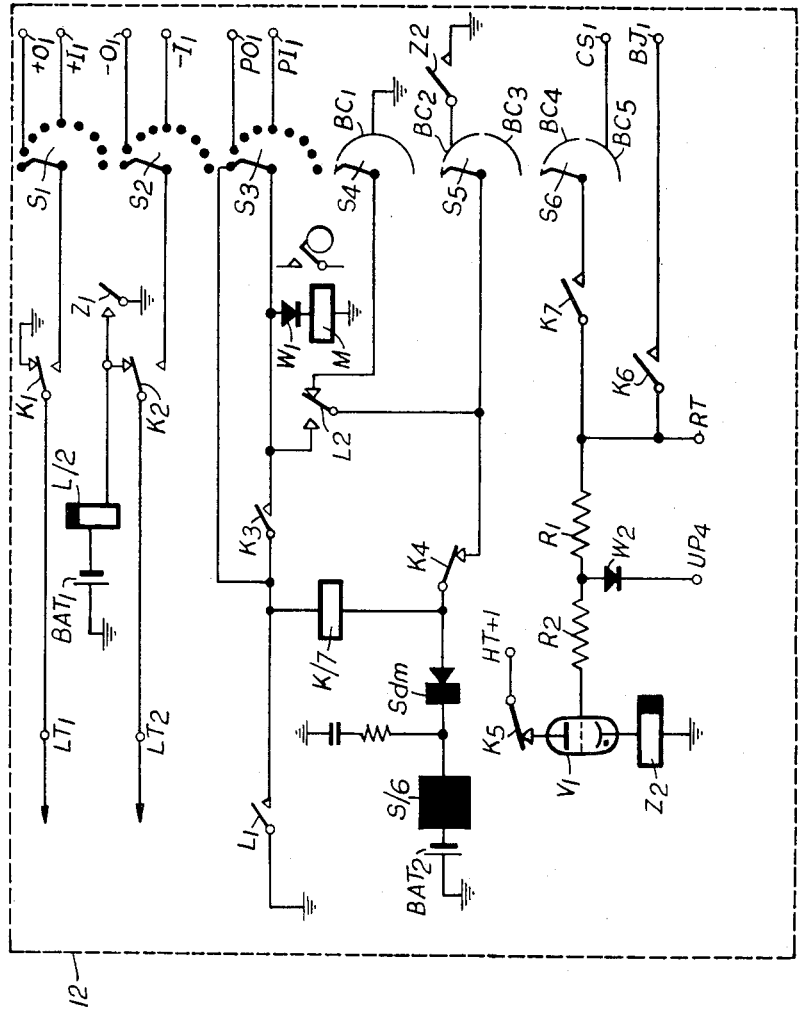
Figure 3:
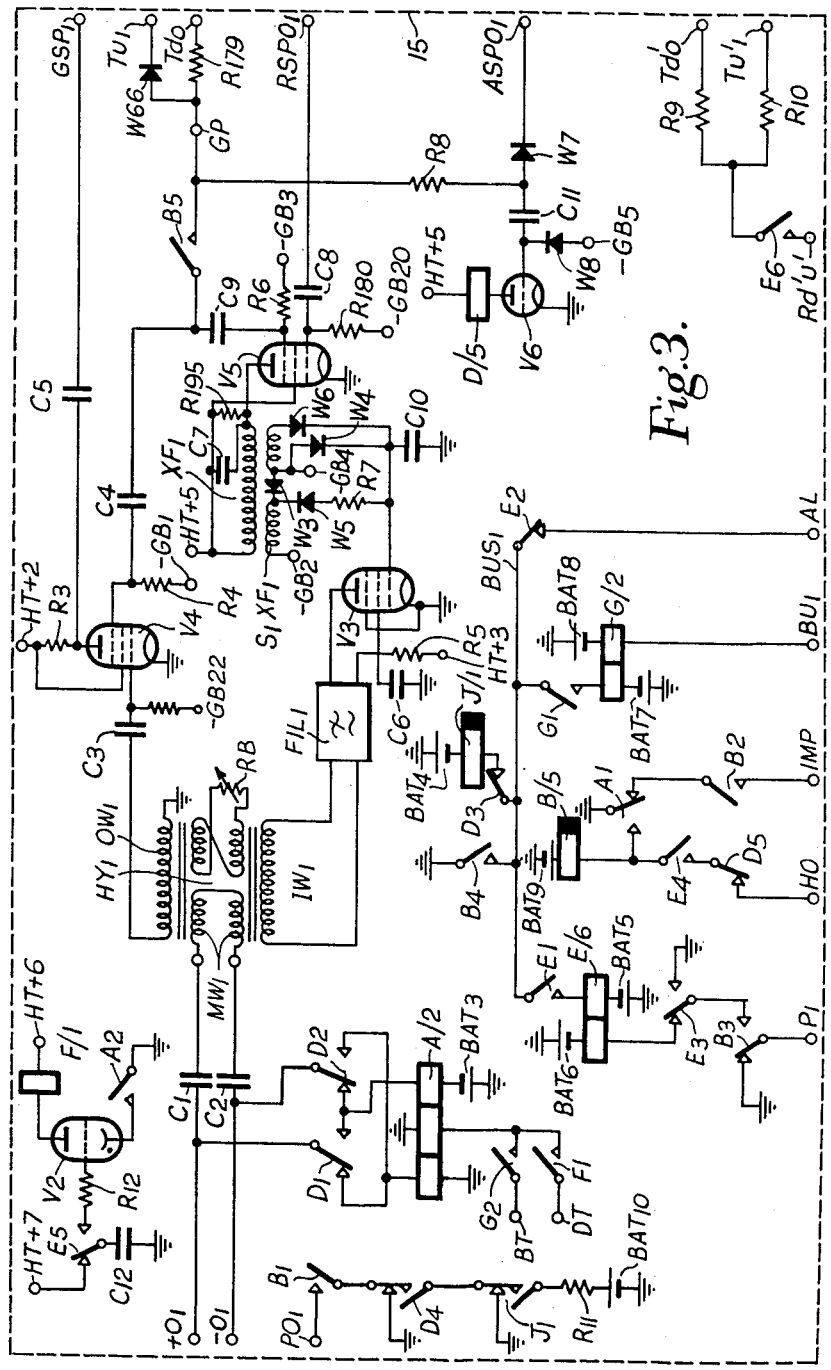
Figure 4:
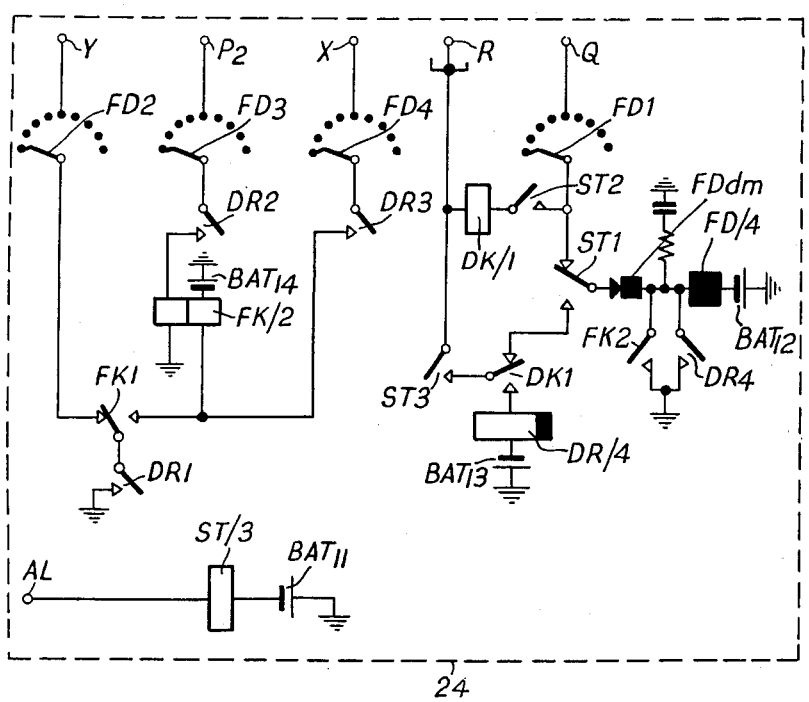
Figure 5:
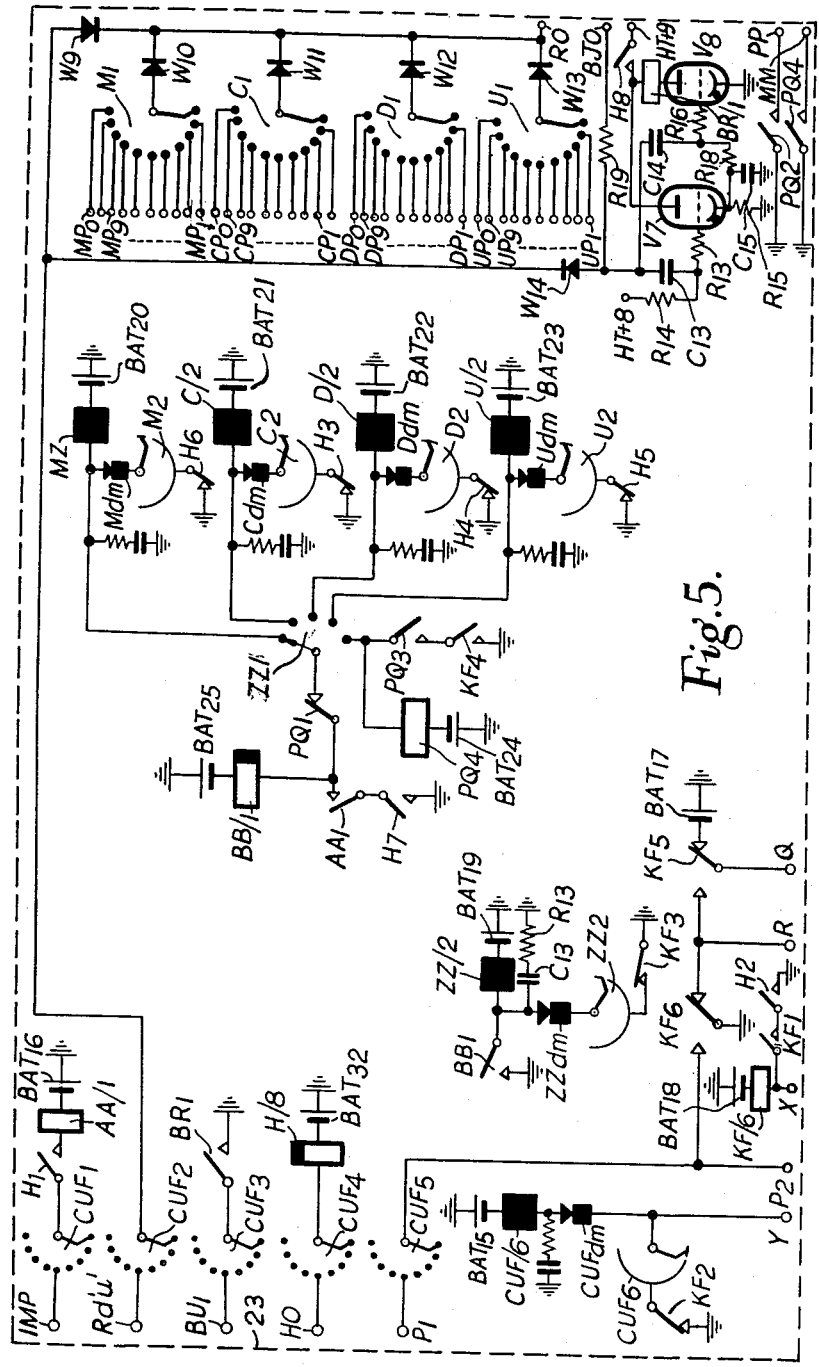
Figure 13:
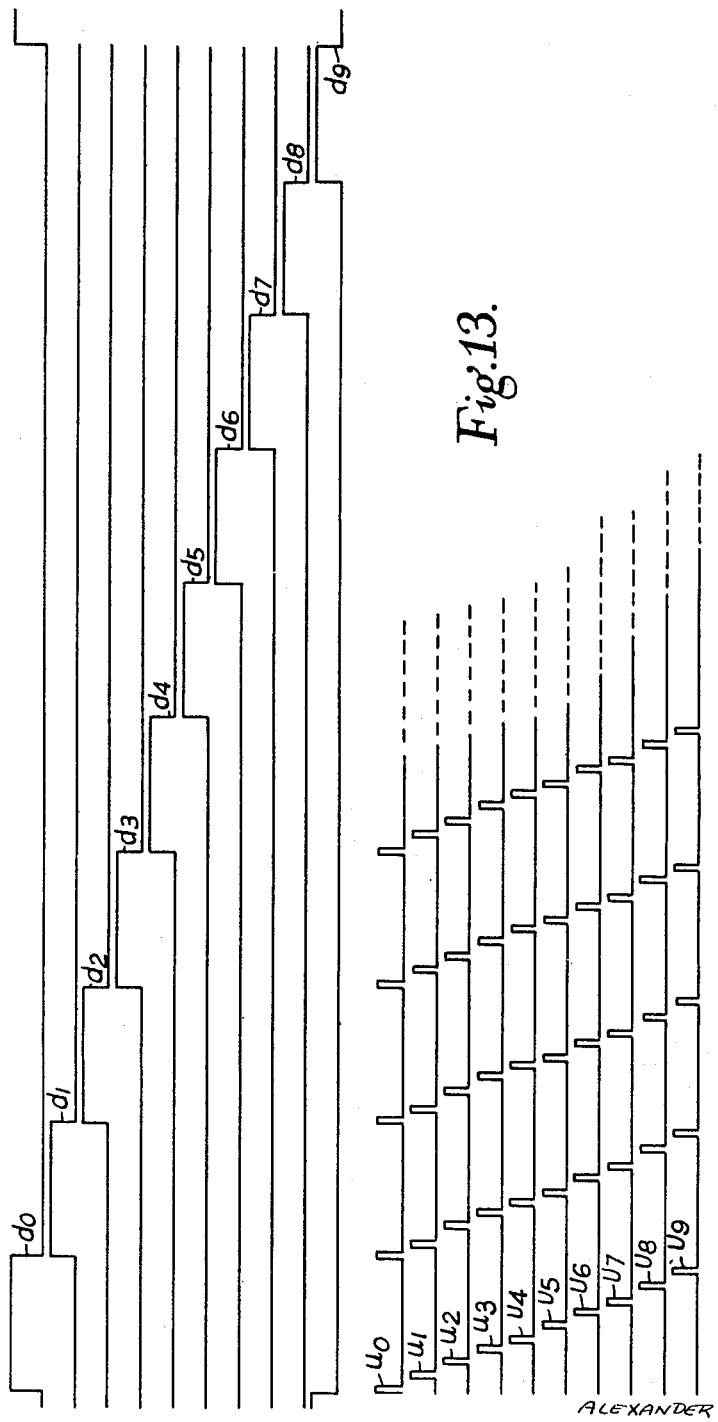
Figures 15A, 15B:
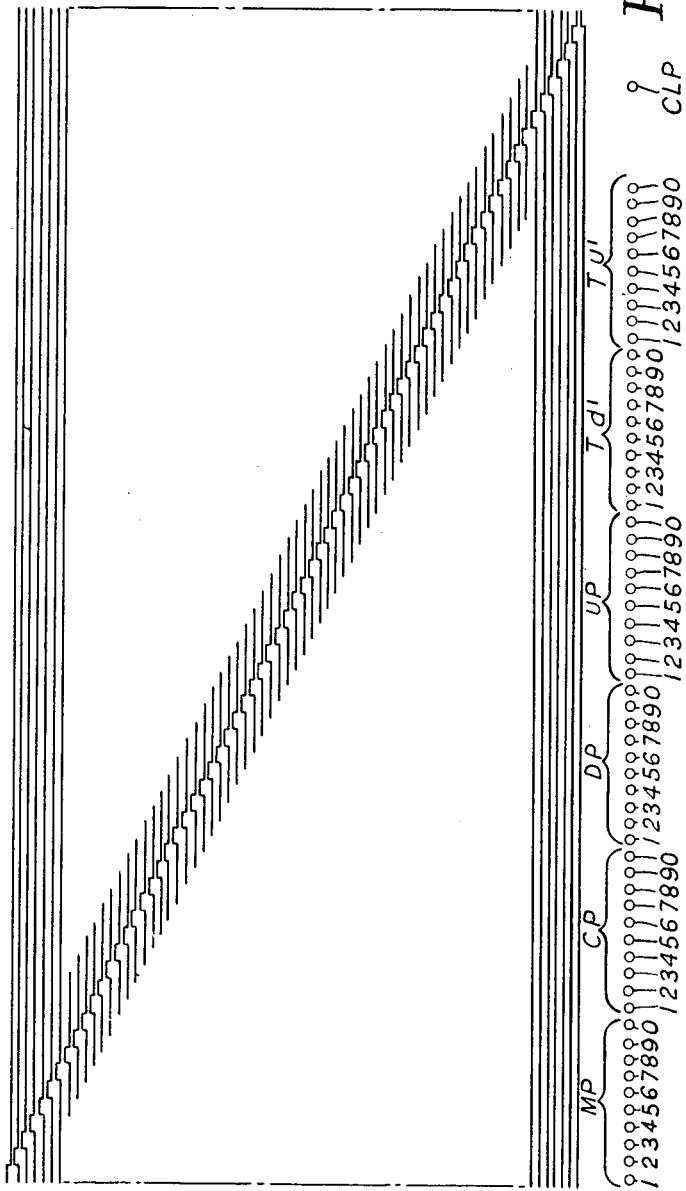
Figure 16:
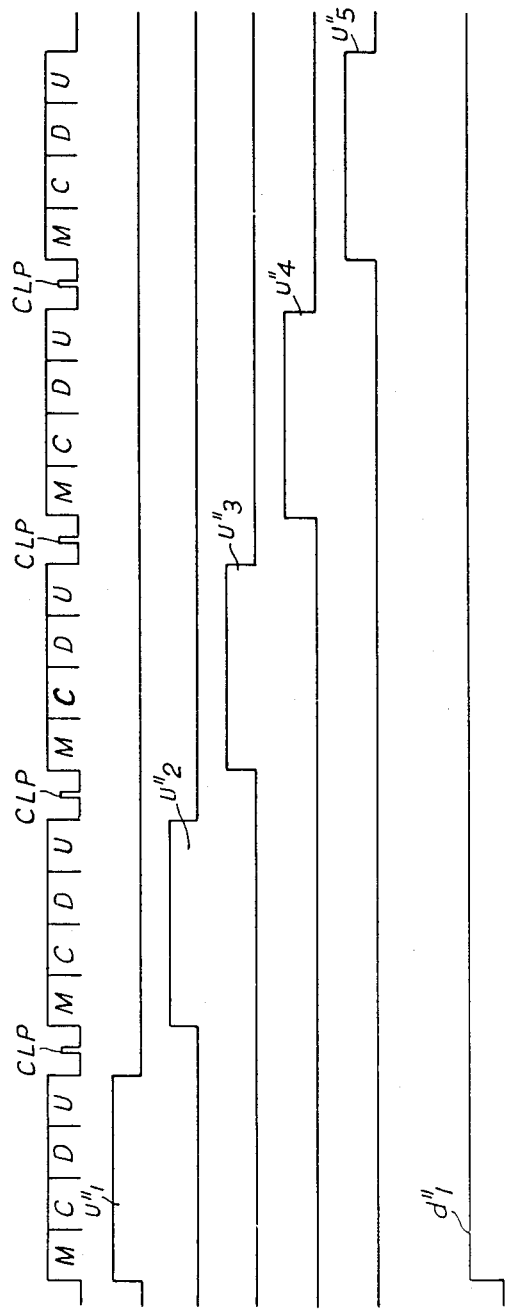
Figure 19:
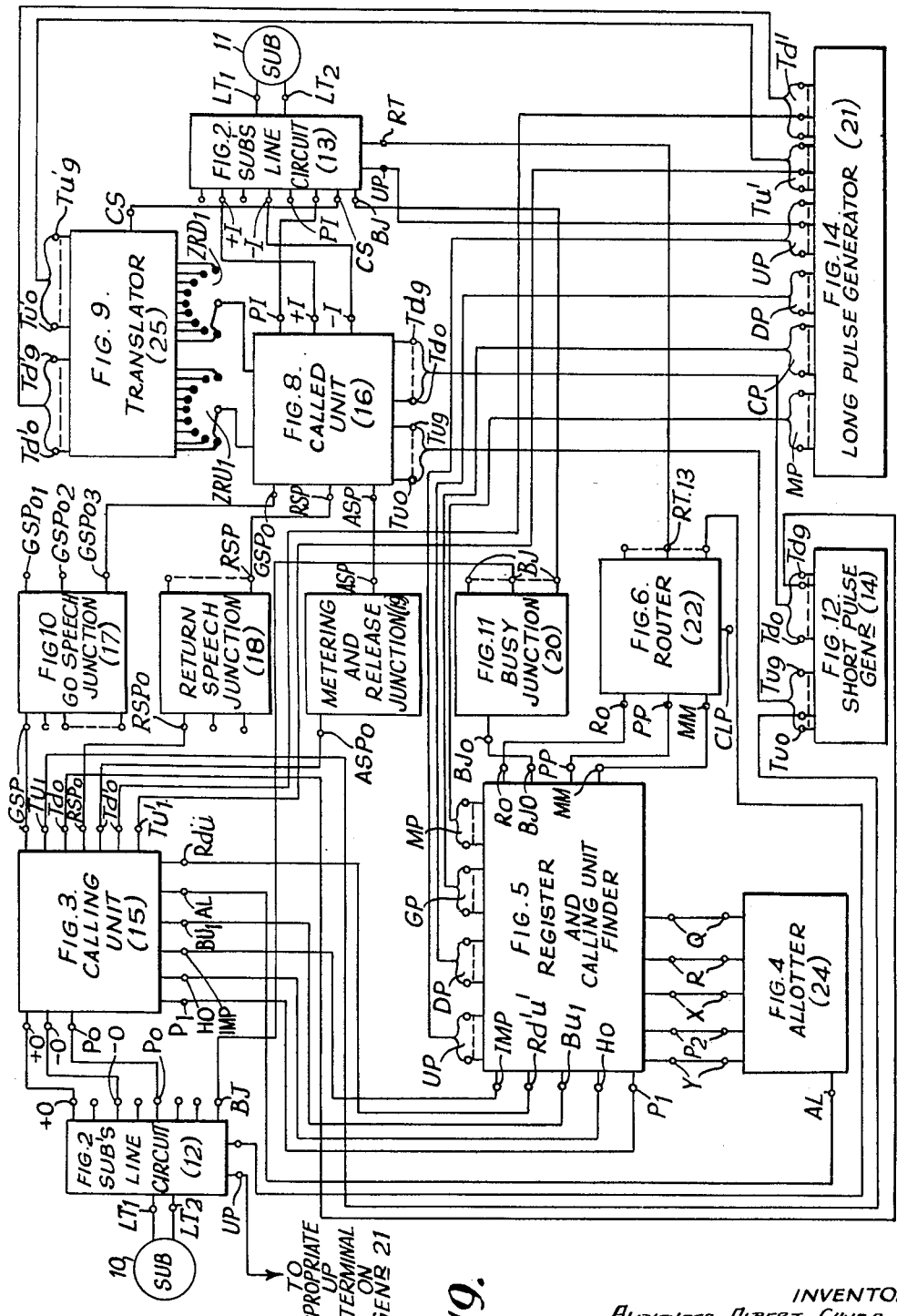

Other objects and features of the invention will be apparent from the following description of the invention given, by way of example, with reference to the accompanying drawings in which:

Figure 1 is a block diagram of an automatic telephone exchange according to the invention, Figures 2 to 12 are circuit diagrams of parts shown in block form in Figure 1, Figure 13 is an explanatory diagram, Figure 14 is a circuit diagram of a part shown in block form in Figure 1, Figures 15 and 16 are explanatory diagrams, Figures 17 and 18 are circuit diagrams showing modifications of the arrangements of Figures 3 and 5 respectively, and Figure 19 is a schematic diagram illustrating the manner in which the circuit diagrams of Figures 2 to 12 and 14 are interconnected to form the block diagram of Figure 1.

Referring to Figure 1, this is a block schematic diagram of an automatic telephone exchange for use with 2,000 subscribers. Of the 2,000 subscribers stations connected to the exchange, one is shown at 10 and another at 11, the station 10 being terminated in the exchange at "sub's line circuit" 12 and the station 11 being terminated in the exchange at "sub's line circuit" 13, to be described later.

The exchange contains 100 communication channels provided by a 100 channel, time-sharing pulse communication arrangement. This arrangement comprises a pulse generator 14 adapted to generate pulses suitable for combination to provide the 100 channels at a pulse repetition frequency of 8,000 P. P. S. as will be described later. The 100 channels are terminated at one end by 100 "calling units" respectively of which one is shown at 15. 100 "called units" are provided for terminating the other ends of the 100 channels respectively when in use, one of the called units being shown at 16. The calling and called units will be described later. Signals between the calling and called units pass through a "Go speech junction" 17, a "Return speech junction" 18, or a "metering and release junction" 19 as the case may be. In the event of a called subscriber being engaged, a "busy signal" is transmitted to the calling subscriber by way of a "busy junction" 20 as will be described later.

In addition to the pulse generator 14 a pulse generator 21 is provided for the purpose of generating pulses suitable for use in routing a calling signal to the terminal equipment 13 of a called subscriber. For the purpose of routing the calling signal to the terminal equipment of the called subscriber a router 22 (to be described later) is employed. The router is operated under the control of a register contained in block 23 in Figure 1.

Assuming the subscriber at station 10 to be calling the subscriber at station 11 the first operation occurs in the sub's line circuit 12. This contains a finder which finds a free calling unit. An allotter 24 (to be described later) then comes into operation and allots a free register and calling unit finder 23 to the calling unit. The calling unit finder operates to connect the calling unit 15 found by the sub's line circuit 12 to the allotted register 23. A dialling tone is then automatically transmitted to the calling subscriber.

Dialling impulses from the calling subscriber's station are transmitted to the register where they are stored on four uniselectors (not shown in Figure 1). Pulses are applied from the pulse generator 21 to the uniselectors which serve to select pulses representative of the four digits dialled. These selected pulses are transmitted, together with pulses representative of the channel number of the free calling unit found by the sub's line circuit 12, to the router 22. The router transmits to the line circuit 13 of the called subscriber 11 a pulse representative of the last digit in the number dialled and the pulses representative of the channel number of the seized calling unit 15.

The line circuit 13, on reception of these pulses, finds a free called unit 16. When the free called unit is seized the pulses representative of the channel number of the seized calling unit are transmitted to a translator 25. The translator contains uni-selectors to be described later which are set to positions dependent upon the characteristics of the received pulses and apply the appropriate speech channel pulses to the called unit from the pulse generator 14 to enable communication to be established between the seized calling and called units, through the "Go" and "Return" speech junctions 17 and 18. A ringing tone is then automatically transmitted to the called subscriber's station. Signals for controlling the metering of the call and for releasing the register 23 and router 22 are transmitted through the metering and release junction 19.

The automatic exchange shown in Figure 1 will now be subscribed in more detail with reference to Figures 2 to 15 and 19. Throughout Figures 2 to 15 all relays and automatic switches are shown in conventional manner the operating windings thereof being referenced with a letter over a figure, the figure indicating the number of relay contacts or banks of switch contacts associated with the winding. The contacts or banks of contacts associated with a winding are given the same letter reference followed by figure references to different contacts or banks of contacts containing different figures. A contact may also have the same reference letter as its operating winding followed by a further letter or letters. All relays and switches are shown in their unoperated positions. The interconnecting circuitry between the terminals of the detailed diagrams of Figures 2–12 and 14 is shown in Figure 19.

Referring to Figure 2 this is a circuit diagram of apparatus suitable for use as the sub's line circuit 12 and 13 of Figure 1. The subscriber's line is connected to line terminals $LT_1$ and $LT_2$, $LT_1$ being normally connected to earth through relay contacts K1 and $LT_2$ being normally connected through relay contacts K2, relay winding L and battery $BAT_1$ to earth. A uni-selector having six banks of contacts S1 to S6 is operated by a winding S and interrupter $Sdm$. The automatic interrupter operation may be as described on page 225 of Telephony, volume 2, by J. Atkinson, published by Sir Isaac Pitman & Sons, Ltd., 1950. This work by Atkinson will be hereinafter referred to as Telephony (either vol. I or II) by Atkinson. Each of the banks S1, S2 and S3 has 25 fixed contacts, a first of the contacts being the "home" contact, the next 12 being "Out" contacts, and the other 12 being "In" contacts.

The banks S1 and S2 are for carrying speech, the wipers thereof being connected to $LT_1$ and $LT_2$ respectively, when the apparatus is in use, by relay contacts K1 and K2. Contacts 2 to 13 of S1 are connected to 12 output terminals respectively of which one is shown at $+O_1$, and contacts 14 to 25 are connected to 12 input terminals respectively of which one is shown at $+I_1$. Contacts 2 to 13 of S2 are connected to 12 output terminals of which one is shown at $-O_1$, and contacts 14 to 25 are connected to 12 input terminals of which one is shown at $-I_1$. The bank S3 is used for control purposes, contacts 2 to 13 being connected to 12 output terminals respectively of which one is shown at $PO_1$, and contacts 14 to 25 being connected to 12 input terminals of which one is shown at $PI_1$.

Bank S4 has an insulated home contact and a homing arc $BC_1$. The function of the homing arc is as described on pages 259 and 260 of Telephony, vol. II by Atkinson.

Bank S5 has an insulated home contact, an arcuate contact $BC_2$ extending over the equivalent of contacts 2 to 13 on S1, S2 and S3, and a further arcuate contact $BC_3$ extending over the equivalent of contacts 14 to 25 on S1, S2 and S3. Contact $BC_2$ is connected through relay contacts Z2 to earth.

Bank S6 has an insulated home contact, an arcuate contact $BC_4$ extending over the equivalent of contacts 2 to 14 of S1, S2 and S3, and a further arcuate contact $BC_5$ extending over the equivalent of contacts 14 to 25 on S1, S2 and S3. Contact $BC_5$ is connected to an output terminal $CS_1$.

The home contact on S3 is connected through relay contacts L1 to earth. The wiper of S3 is connected through contacts K3 and L1 to earth; through contacts L2, and K4 to contacts $Sdm$; and through a rectifier $W_1$ and meter winding M to earth.

The wiper of S4 is connected through contacts L2 to contacts K5 and to the wiper of S5.

The wiper of S6 is connected through relay contacts K7 to an input terminal RT. This terminal is connected through relay contacts K6 to an output terminal $BJ_1$ and through resistors $R_1$ and $R_2$ in series to the control grid of a gas-filled triode valve $V_1$. An input terminal $UP_2$ is connected through a rectifier $W_2$ to the junction of resistors $R_1$ and $R_2$. The cathode lead of the valve $V_1$ has in series therewith a relay winding Z and the anode of the valve $V_1$ is connected through relay contacts K5 to the terminal HT+1 of a source (not shown) of D. C. whose negative terminal is earthed. A relay winding K is connected between contacts $Sdm$ and L1.

Referring now to Figure 3 this is a circuit diagram of apparatus suitable for use as the calling unit 15 of Figure 1. It will be assumed that this calling unit is that connected to terminals $+O_1$, $-O_1$ and $PO_1$ of Figure 2, these terminals also being shown in Figure 3. Terminal $+O_1$ is connected through relay contacts D1 and one winding of relay A to earth. Terminal $-O_1$ is connected through relay contacts D2, a second winding of relay A and a battery $BAT_3$ to earth. Terminals $+O_1$ and $-O_1$ are also connected through capacitors $C_1$ and $C_2$ respectively to a winding $MW_1$ of a hybrid transformer $HY_1$ which has a balancing resistor RB. The function of the hybrid transformer and balancing resistor is as described on page 83, vol. I of Telephony by Atkinson.

The winding $OW_1$ of the hybrid transformer is connected through a capacitor $C_3$ to the control grid of a pentode valve $V_4$ whose anode is connected through a load resistor $R_3$ to the positive terminal HT+2 of a source (not shown) of D. C. whose negative terminal is earthed. The cathode of the valve $V_4$ is earthed, the screen grid is connected directly to the terminal HT+2, and the suppressor grid is connected through a resistor $R_4$ to the negative terminal $-GB_1$ of a bias source (not shown) whose positive terminal is earthed. The suppressor grid is also connected through a capacitor $C_4$ and relay contacts B5 to a terminal GP. The anode of the valve $V_4$ is connected through a capacitor $C_5$ to a terminal GSP.

Winding $IW_1$ of the hybrid transformer $HY_1$ is connected to the output of a low-pass filter $FiL_1$. One input terminal of the filter is connected to the anode of a pentode valve $V_3$ and the other to earth through a capacitor $C_6$ and through a resistor $R_5$ to the positive terminal HT+3 of a source of D. C. (not shown). The suppressor grid and cathode of the valve $V_3$ are connected to earth.

A terminal $RSP_1$ is connected through a capacitor $C_8$ to the control grid of a pentode valve $V_5$ whose cathode is earthed. Negative bias is applied to the control grid of the valve $V_5$ from the negative terminal $-GB_{20}$ of a bias source (not shown) whose positive terminal is earthed. The anode of the valve $V_5$ is connected through the primary winding of a transformer $XF_1$ to the positive terminal HT+4 of a source (not shown) of D. C. whose negative terminal is earthed. The screen grid of the valve $V_5$ is connected directly to the terminal HT+4 and the suppressor grid is connected through a resistor $R_6$ to the negative terminal $-GB_3$ of a bias source (not shown) whose positive terminal is earthed. The suppressor grid of the valve $V_5$ is also connected through a capacitor $C_9$ and the contacts B5 to the terminal GP.

The transformer $XF_1$ has two secondary windings $S_1XF_1$ and $S_2XF_1$. One terminal of winding $S_1XF_1$, is connected to the negative terminal $-GB_2$ of a bias source (not shown) and the other terminal is connected through a rectifier $W_5$, a resistor $R_7$ and the capacitor $C_7$ to the control grid of the pentode valve $V_3$. One terminal of the winding $S_2XF_1$ is connected to the negative terminal $-GB_4$ of a bias source (not shown) whose positive terminal is earthed, and the other terminal of the winding $S_2XF_1$ is connected through a rectifier $W_6$ to the control grid of the valve $V_3$. The terminal $-GB_4$ is also connected to the control grid of $V_3$ and a capacitor $C_{10}$ is connected between the control grid of $V_3$ and earth.

A terminal $ASPO_1$ is connected through a rectifier $W_7$ and capacitor $C_{11}$ to the control grid of a triode valve $V_6$ whose cathode is earthed and whose anode is connected through a relay winding D to the positive terminal HT+5 of a D. C. source (not shown) whose negative terminal is earthed. The control grid of the valve $V_6$ is also connected through a rectifier $W_8$ to the negative terminal —GB₅ of a bias source (not shown) whose positive terminal is earthed. The junction of the capacitor $C_{11}$ and the rectifier $W_7$ is connected to the terminal GP through a resistor $R_8$.

A relay winding J has one terminal connected to earth through a battery $BAT_4$. The other terminal of the relay winding J is connected to earth through relay contacts D3, a busbar $BUS_1$ and relay contacts B4. The busbar is connected through relay contacts E1, one winding of relay E and a battery $BAT_5$ to earth. A control terminal $P_1$ is connected either directly to earth or through the other winding of relay E and a battery $BAT_6$ to earth depending upon the setting of relay contacts B3 and E3. The busbar $BUS_1$ is connected through relay contacts G1, one winding of a relay G and a battery $BAT_7$ to earth. The other winding of the relay G has one terminal connected to earth through a battery $BAT_8$, and has its other terminal connected directly to a terminal $BU_1$. The busbar is also connected through relay contacts E2 to an output terminal AL.

Terminal HO is connected through relay contacts D5, E4 and A1 to earth. A relay winding B has one terminal connected through contacts A1 to earth and the other through a battery $BAT_9$ to earth. An output terminal IMP is connected through relay contacts B2 and A1 to earth.

Input terminals $Td^1_0$ and $Tu^1_1$ are connected together through resistors $R_9$ and $R_{10}$ and the junction of these two resistors is connected through relay contacts E6 to an output terminal $Rd^1u^1$.

Terminal $PO_1$ is connected through relay contacts B1 to relay contacts D4 which depending upon their setting, provide either an earth connection or a connection to relay contacts J1. The relay contacts J1 provide either an earth connection or a connection through a resistor $R_{11}$ and a battery $BAT_{10}$ to earth.

The cathode of a gas-filled triode valve $V_2$ is connected to earth through relay contacts A2 and its anode is connected through a relay winding F to the positive terminal $HT+6$ of a suitable source (not shown) of D. C. whose negative terminal is earthed. A capacitor $C_{12}$ is normally connected to the positive terminal $HT+7$ of a source (not shown) of D. C. whose negative terminal is earthed. The control grid of the valve $V_2$ is connected to the capacitor $C_{12}$ through a resistor $R_{12}$ and the contacts E5.

A source (not shown) of busy tone is connected to the terminal BT which is connected to the centre winding of the relay A through relay contacts G2.

A source (not shown) of dialling tone is connected to the terminal DT which is connected through relay contacts F1 to the centre winding of the relay A.

Referring now to Fig. 4, this is a circuit diagram of an allotter suitable for use at 24 in Fig. 1. The terminal AL corresponds to the terminal AL of Fig. 3, and is connected through a relay winding ST and a battery $BAT_{11}$ to earth. A uni-selector FD has four banks of contacts FD1, FD2, FD3 and FD4 whose wipers are controlled by automatic stepping apparatus including winding FD and contacts FD$dm$. The wiper of the bank FD1 is connected through relay contacts ST1, the contacts FD$dm$ the winding FD and a battery $BAT_{12}$ to earth. The junction of the contacts FD$dm$ and the winding FD is connected to earth through relay contacts FK2 and DR4. The fixed contacts of the blank FD1 are connected to output terminals respectively of which one is shown at Q. A terminal R is connected through a relay winding DK and relay contacts ST2 to the moving contact of the bank FD1. The terminal R is also connected through contacts ST3, and DK1 to contacts ST1. The contacts DK1 are also connected through relay winding DR and a battery $BAT_{13}$ to earth.

The bank contacts of the bank FD4 are connected to output terminals respectively of which one is shown at X. The wiper of the bank FD4 is connected through relay contacts DR3, FK1, and DR1 to earth.

The fixed contacts of the bank FD3 are connected to output terminals respectively of which one is shown at $P_2$. The wiper of the bank FD3 is connected through relay contacts DR2 and one winding of relay FK to earth. One terminal of the other winding of the relay FK is connected through the contacts FK1 and DR1 to earth, and the other terminal thereof is connected through a battery $BAT_{14}$ to earth.

The bank contacts of the bank FD2 are connected to output terminals respectively of which one is shown at Y. The wiper of FD2 is connected through the contacts FK1 and DR1 to earth.

Referring now to Fig. 5, this is a theoretical circuit diagram of a suitable register and calling unit finder for use in the arrangement of Fig. 1. The terminals IMP, $Rd^1u^1$, $BU_1$, HO, and $P_1$ correspond to the terminals of the same reference in Fig. 3, and terminals Y, $P_2$, X, R and Q correspond to those of the same reference in Fig. 4.

The calling unit finder section of the arrangement shown in Fig. 5 comprises a uni-selector CUF having six banks CUF1 to CUF6, whose wipers are driven by an automatic stepping circuit including a battery $BAT_{15}$ connected between earth and one terminal of winding CUF, and contacts CUF$dm$ connected between the other terminal of winding CUF and the terminal Y. The IMP terminals of several calling units (15, Fig. 1) are connected to the bank contacts respectively of the bank CUF1 whose wiper is connected through relay contacts H1, a relay winding AA and a battery $BAT_{16}$ to earth. The terminals $Rd^1u^1$ of the several calling units are connected to the bank contacts of CUF2 respectively whose wiper is connected through a rectifier $W_9$ to an output terminal RO. The $BU_1$ terminals of the several calling units are connected to the bank contacts respectively of CUF3 whose wiper is connected through relay contacts BR1 to earth. The HO terminals of the several calling units are connected to the bank contacts respectively of CUF4 whose wiper is connected through a relay winding H and a battery $BAT_{32}$ to earth. The $P_1$ terminals of the several calling units are connected to the bank contacts respectively of CUF5 whose wiper is connected to terminal $P_2$. The bank CUF6 is a homing bank. Each of the banks CUF1 to CUF6 has an insulated home contact.

The terminal $P_2$ is also connected through relay contacts KF6 to earth. The terminal R is connected through relay contacts KF6 to earth and through relay contacts KF5 to terminal Q which is also connected through contacts K5 and a battery $BAT_{17}$ to earth. The terminal X is connected through a relay winding KF and battery $BAT_{18}$ to earth, and through relay contacts KF1 and H2 to earth.

A uni-selector ZZ has two banks ZZ1 and ZZ2 whose wipers are driven by an automatic stepping circuit including winding ZZ and contacts ZZ$dm$. The winding ZZ has one terminal connected through a battery $BAT_{19}$ to earth and the other through relay contacts BB1 to earth, and through the contacts ZZ$dm$ to the wiper of ZZ2. A capacitor $C_{13}$ and resistor $R_{13}$ are employed to reduce sparking between the contacts ZZ$dm$ when in operation. The bank ZZ2 is a homing bank and is connected to earth through relay contacts KF3.

The register section of Fig. 5 comprises four uni-selectors M, C, D and U. The uni-selectors are operated by impulses caused by the operation of relay contacts AA1 as will be described later. The moving contact of AA1 is connected through relay contacts H7 to earth and the fixed contact of AA1 is connected through relay contacts $PQ_1$ to the wiper of the uni-selector bank ZZ1. The first four bank contacts of ZZ1 are connected to the windings M, C, D and U respectively whose other terminals are connected to earth through batteries $BAT_{20}$ to $BAT_{23}$ respectively. The first four bank contacts of ZZ1 are also connected through contacts M$dm$, C$dm$, D$dm$ and U$dm$ to the wipers of the banks M2, C2, D2 and U2 respectively. Each of these banks is a homing bank. The homing arcs of the homing banks M2, C2, D2 and U2 are connected to earth through relay contacts H6, H3, H4 and H5 respectively.

The fifth contact of ZZ1 is connected through a relay winding PQ and a battery $BAT_{24}$ to earth, and through relay contacts $PQ_3$ and $KF_4$ in series to earth. A relay winding BB is connected between the fixed contact of $AA_1$ and the negative terminal of a battery $BAT_{25}$ whose positive terminal is earthed.

Each of the banks M1, C1, D1, and U1, has an insulated home contact and ten bank contacts. The ten bank contacts of M1 are connected to terminals $MP_1$ to $MP_9$ and $MP_0$ respectively. The ten bank contacts of C1 are connected to terminals $CP_1$ to $CP_9$ and $CP_0$ respectively. The ten bank contacts of D1 are connected to terminals $DP_1$ to $DP_9$ and $DP_0$ respectively, and those of U1 are connected to terminals $UP_1$ to $UP_9$ and $UP_0$ respectively. The wipers of the banks M1, C1, D1 and U1 are connected through rectifiers $W_{10}$ to $W_{13}$ respectively to the terminal RO.

An input terminal BJO is connected through a resistor $R_{19}$ and a capacitor $C_{13}$ and resistor $R_{13}$ in series to the control grid of a gas-filled triode $V_7$. The junction of $R_{13}$ and $C_{13}$ is connected through a resistor $R_{14}$ to the positive terminal HT+8 of a source (not shown) of D. C. whose negative terminal is earthed. The cathode of the valve $V_7$ is connected to earth through a resistor $R_{15}$ and the anode of the valve $V_7$ is connected through relay contacts $H_8$ to the positive terminal HT+9 of a source (not shown) of D. C. whose negative terminal is earthed.

The terminal BJO is also connected through a capacitor $C_{14}$ and a resistor $R_{16}$ to the control grid of a gas-filled triode $V_8$ whose cathode is earthed. The junction of $C_{14}$ and $R_{16}$ is connected through two resistors $R_{17}$ and $R_{18}$ in series to the cathode of the valve $V_7$, and the junction of $R_{17}$ and $R_{18}$ is connected to earth through a capacitor $C_{15}$. The anode of the valve $V_8$ is connected to the terminal HT+ through a relay winding BR. The junction of the resistor $R_{19}$ and the capacitor $C_{13}$ is connected through a rectifier $W_{14}$ to the wiper of switch bank CUF2. Terminal PP is connected through relay contacts $PQ_2$ to earth, and terminal MM is connected through relay contacts $PQ_4$ to earth.

Figure 6:
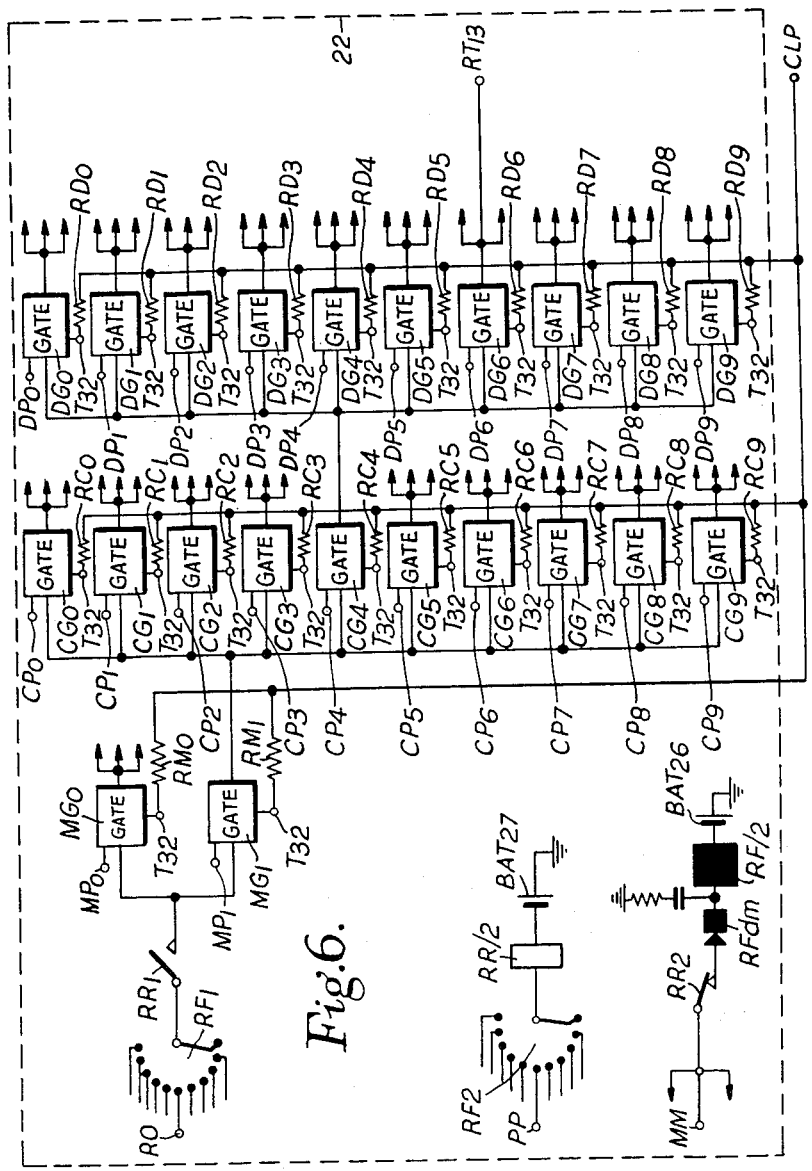

A suitable router (22, Fig. 1) will now be described with reference to Figs. 6 and 7. Referring to Fig. 6, this is a block schematic diagram of part of the router, the terminals RO, PP and MM corresponding to the terminals of like reference respectively in Fig. 5. The terminal MM is connected through relay contacts RR2, contacts RF$dm$ a uni-selector winding RF and a battery $BAT_{26}$ to earth. The uni-selector RF has two banks RF1 and RF2. The bank contacts of the bank RF1 are connected to the terminals RO of the several registers respectively. The other bank contacts of RF2 are connected to the terminals PP of the several registers respectively and the wiper of RF2 is connected through a relay winding RR and a battery $BAT_{27}$ to earth.

The wiper of bank RF1 is connected through relay contacts RR1 to the input terminals of two gates $MG_0$ and $MG_1$. A gating voltage terminal $MP_0$ is connected to the gate $MG_0$ and a gating voltage terminal $MP_1$ is connected to the gate $MG_1$. These gates will be referred to as the M gates.

The outputs of the M gates are applied to two groups respectively of further gates each group having ten gates. These gates will be referred to as the C gates of which one group is shown at $CG_0$ to $CG_9$ connected to the output of the gate $MG_1$. The gates $CG_0$ to $CG_9$ have gating voltage terminals $CP_0$ to $CP_9$ respectively.

The outputs of the 20 C gates are applied to 20 groups respectively of further gates which will be referred to as the D gates. One group $DG_0$ to $DG_9$ of D gates is shown connected to the output of the C gate $CG_4$. The D gates $DG_0$ to $DG_9$ have gating voltage terminals $DP_0$ to $DP_9$ respectively.

The outputs of the 200 D gates are connected to 200 groups of sub's line circuits (12 and 13 of Figure 1) each group containing 10 sub's line circuits. In Figure 6 one output terminal $RT_{13}$ is shown connected to the output of the D gate $DG_6$, the subscript 13 in the reference $RT_{13}$ indicating that this terminal is connected to the terminal RT in the sub's line circuit 13 of Figure 1. Each of the gates shown in Figure 6 has a terminal $T_{32}$ through which, in operation voltages are applied for closing the gates. The terminals $T_{32}$ of the gates $MG_0$ and $MG_1$ are connected through resistors $RM_0$ and $RM_1$ respectively to a terminal CLP, the terminals $T_{32}$ of the gates $CG_0$ to $CG_9$ are connected through resistors $RC_0$ to $RC_9$ respectively to the terminal CLP, and the terminals $T_{32}$ of the gates $DG_0$ to $DG_9$ are connected through resistors $RD_0$ to $RD_9$ respectively to the terminal CLP.

Figure 7:
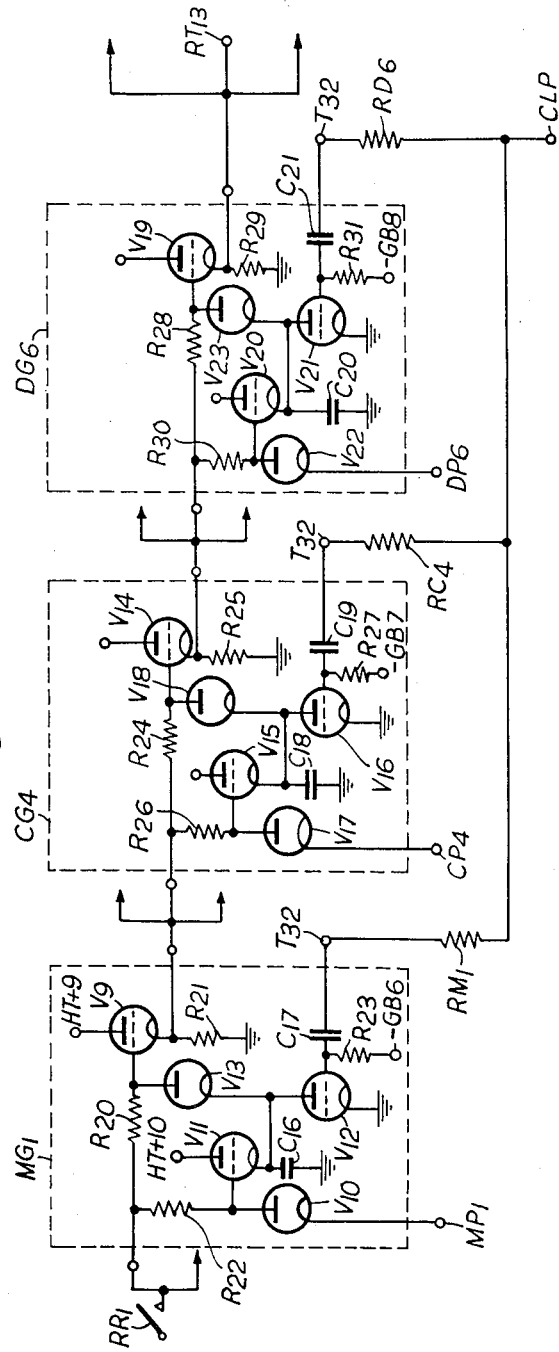

Referring now to Figure 7 this is a theoretical circuit diagram of three of the gates shown in block form in Figure 6. The gates shown in Figure 7 are the gates $MG_1$, $CG_4$ and $DG_6$ of Figure 6. The input to the gate $MG_1$ is applied through a resistor $R_{20}$ to the control grid of a triode valve $V_9$ whose anode is connected to the positive terminal HT+9 of a D. C. source (not shown) whose negative terminal is earthed. The cathode of the triode $V_9$ is connected to earth through a cathode load resistor $R_{21}$. The terminal $MP_1$ is connected to the cathode of a diode valve $V_{10}$ whose anode is connected to the input terminal of the gate through a resistor $R_{22}$, and directly to the control grid of a triode valve $V_{11}$. The anode of the triode $V_{11}$ is connected to the positive terminal HT+10 of a source (not shown) of D. C. whose negative terminal is earthed. The cathode of the triode $V_{11}$ is connected to earth through a capacitor $C_{16}$. The terminal $T_{32}$ of the gate $MG_1$ is connected through a capacitor $C_{17}$ to the control grid of a triode valve $V_{12}$ whose cathode is earthed. The control grid of the triode $V_{12}$ is also connected through a grid leak $R_{23}$ to the negative terminal $-GB_6$ of a bias source (not shown) whose negative terminal is earthed. The anode of the triode $V_{12}$ is connected to the cathode of the triode $V_{11}$ and to the cathode of a diode valve $V_{13}$ whose anode is connected to the control grid of the triode $V_9$. The output of the gate $MG_1$ is taken from the cathode of the cathode follower valve $V_9$.

The gate $CG_4$ is identical with the gate $MG_1$ and contains three triode valves $V_{14}$, $V_{15}$, $V_{16}$, two diode valves $V_{17}$ and $V_{18}$, four resistors $R_{24}$ to $R_{27}$, two capacitors $C_{18}$ and $C_{19}$, and a terminal $-GB_7$ which is connected to the negative terminal of a bias source (not shown) whose positive terminal is connected to earth.

The gate $DG_6$ is also identical with the gate $MG_1$ and contains three triode valves $V_{19}$, $V_{20}$ and $V_{21}$, two diode valves $V_{22}$ and $V_{23}$, four resistors $R_{28}$ to $R_{31}$, two capacitors $C_{20}$ and $C_{21}$, and a terminal $-GB_8$ which is connected to the negative terminal of a bias source (not shown) whose positive terminal is earthed.

Figure 8:
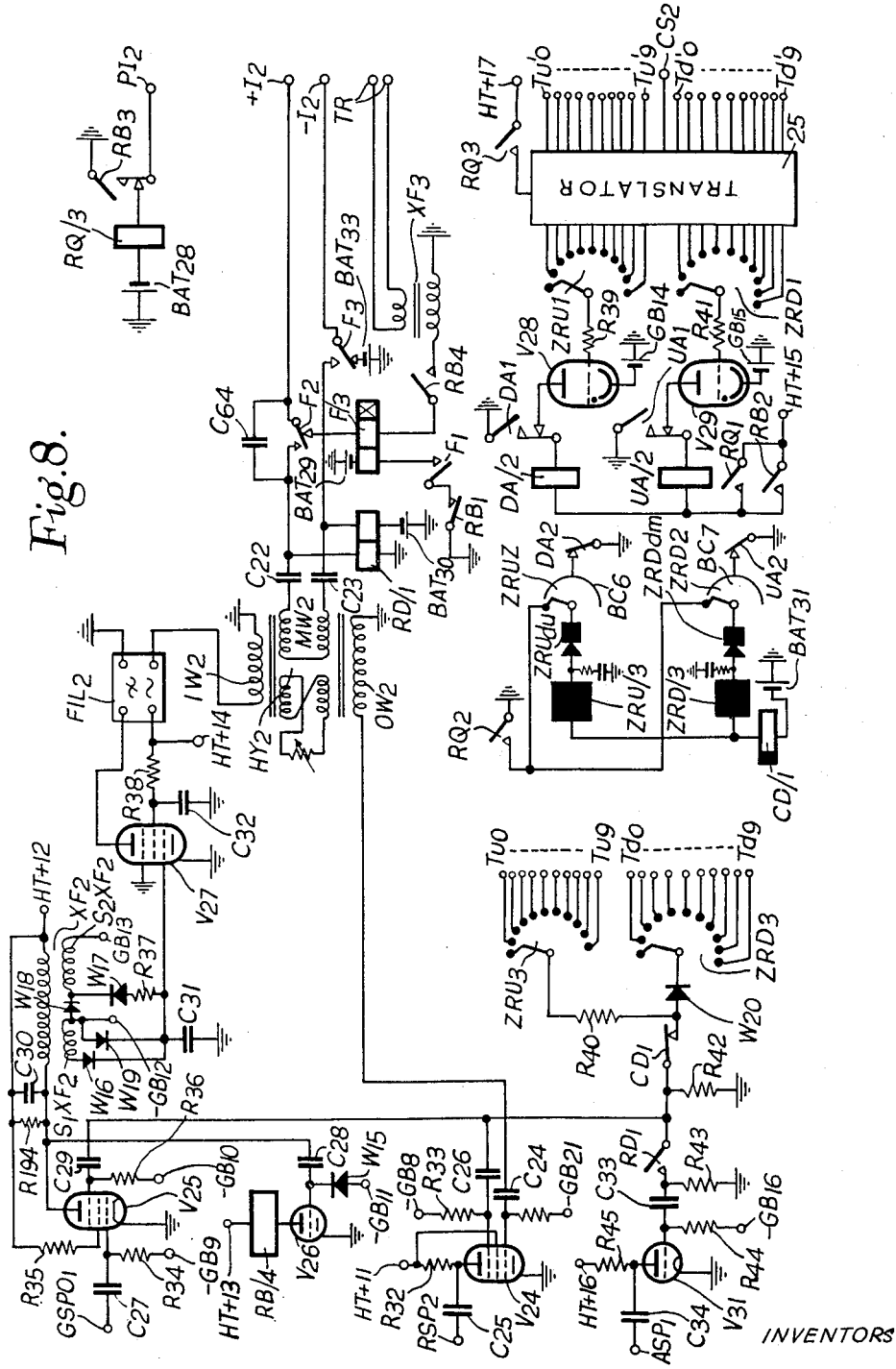

Referring to Figure 8 this is a theoretical circuit diagram of a suitable called unit (16, Figure 1). In Figure 8 a control terminal $PI_2$ is connected through relay contacts RB3 a relay winding RQ and a battery $BAT_{23}$ to earth. The terminal $PI_2$ is connected to one of the PI terminals of the bank S3 of the uniselector in one of the sub's line circuits (Figure 2). Two terminals $+I_2$ and $-I_2$ are connected through relay contacts F2 and F3 respectively, and capacitors $C_{22}$ and $C_{23}$ to a winding $MW_2$ of a hybrid transformer $HY_2$. An output winding $OW_2$ of the transformer $HY_2$ has one terminal earthed and the other terminal thereof is connected through a capacitor $C_{24}$ to the control grid of a pentode valve $V_{24}$ whose cathode is earthed. The anode of the valve $V_{24}$ is connected through a load resistor $R_{32}$ to the positive terminal HT+11 of a source (not shown) of D. C. whose negative terminal is earthed. The anode is also connected through a capacitor $C_{25}$ to an output terminal $RSP_2$, and the screen grid is connected directly to the terminal $HT+11$. Negative bias is applied to the control grid of the valve $V_{24}$ from a bias terminal $-GB_{21}$. The suppressor grid is connected through a capacitor $C_{26}$ to relay contacts CD1, and through a resistor $R_{33}$ to the negative terminal $-GB_8$ of a bias source (not shown) whose positive terminal is earthed.

An input terminal $GSPO_1$ is connected through a capacitor $C_{27}$ to the control grid of a pentode valve $V_{25}$ whose cathode is earthed. The control grid of the pentode $V_{25}$ is also connected through a resistor $R_{34}$ to the negative terminal $-GB_9$ of a bias source (not shown) whose positive terminal is earthed. The anode of the pentode $V_{25}$ is connected through the primary winding of a transformer $XF_2$ to the positive terminal $HT+12$ of a source (not shown) of D. C. whose negative terminal is earthed. The anode is also connected through a capacitor $C_{28}$ to the control grid of a triode valve $V_{26}$ whose cathode is earthed. The anode of the triode $V_{26}$ is connected through a relay winding RB to the positive terminal $HT+13$ of a source (not shown) of D. C. whose negative terminal is earthed. The control grid of the triode $V_{26}$ is connected through a rectifier $W_{15}$ to the negative terminal $-GB_{11}$ of a bias source whose positive terminal is earthed. The screen grid of the pentode $V_{25}$ is connected through a resistor $R_{35}$ to the positive terminal $HT+12$. The suppressor grid is connected through a resistor $R_{36}$ to the negative terminal $-GB_{10}$ of a bias source (not shown) whose positive terminal is earthed, and through a capacitor $C_{29}$ to the relay contacts CD1.

The transformer $XF_2$ has two secondary windings $S_1XF_2$ and $S_2XF_2$. One terminal of the winding $S_1XF_2$ is connected to the negative terminal $-GB_{12}$ of a bias source (not shown) whose positive terminal is earthed, and the other terminal thereof is connected through a rectifier $W_{16}$ and a capacitor $C_{30}$ to the control grid of a pentode valve $V_{27}$ whose cathode is earthed. One terminal of the winding $S_2XF_2$ is connected to earth and the other terminal thereof is connected through a rectifier $W_{17}$, a resistor $R_{37}$ and the capacitor $C_{30}$ to the control grid of the pentode $V_{27}$. The left-hand plate (in the drawing) of the capacitor $C_{30}$ is connected through a rectifier $W_{18}$ and a capacitor $C_{31}$ in parallel to the negative terminal of a bias source (not shown) whose positive terminal is earthed. The centre grid of the pentode $V_{27}$ is connected through a rectifier $W_{19}$ to the terminal $-GB_{13}$.

The anode of the pentode $V_{27}$ is connected through the input circuit of a low-pass filter $FIL_2$ to the positive terminal $HT+14$ of a source (not shown) of D. C. whose negative terminal is earthed. The screen grid of the pentode $V_{27}$ is connected through a resistor $R_{38}$ to the positive terminal $HT+14$ and is decoupled by a capacitor $C_{32}$. One output terminal of the low-pass filter $FIL_2$ is connected to earth and the other output terminal is connected through the winding $IW_2$ of the hybrid transformer $HY_2$ to earth.

The terminal $-I_2$ is normally connected to earth through the relay contacts F3 and a battery $BAT_{33}$, and the terminal $+I_2$ is normally connected through the relay contacts F2 and through one winding of a relay F to the moving contact of relay contacts RB4. These contacts are normally open and the fixed contact thereof is connected through the secondary winding of a transformer $XF_3$ to earth. The primary winding of the transformer $XF_3$ is connected to terminals TR to which ringing current is applied from a suitable source (not shown). The contacts F2 are bridged by a capacitor $C_{64}$. One terminal of the other winding of relay F is connected through a battery $BAT_{29}$ to earth and the other terminal thereof is connected through relay contacts FL and RB1 to earth. One winding of a relay RD is connected between the right-hand plate (in the drawing) of the capacitor $C_{23}$ and earth. The other winding of the relay RD has one terminal connected to the right-hand plate of the capacitor $C_{23}$ and has the other terminal connected through a battery $BAT_{30}$ to earth.

A uniselector ZRU has three banks ZRU1, ZRU2 and ZRU3, each of which has a home contact and bank contacts. The bank ZRU1 has ten bank contacts which are connected to the translator 25 to be described later. The wiper of the bank ZRU1 is connected through a resistor $R_{39}$ to the control grid of a gas-filled triode valve $V_{28}$. The cathode of the valve $V_{28}$ is connected to the negative terminal of a bias source $GB_{14}$ whose positive terminal is earthed. The anode of the valve $V_{28}$ is connected through relay contacts DA1 to one terminal of a relay winding DA. The other terminal of the winding DA is connected through relay contacts RQ1 and RB2 in parallel to the positive terminal $HT+15$ of a source (not shown) of D. C. whose negative terminal is earthed.

The bank ZRU2 is a homing bank and has its homing arc $BC_6$ connected to earth through relay contacts DA2. The wiper of the bank ZRU2 is connected through contacts ZRU$dm$, operating winding ZRU, a relay winding CD and a battery $BAT_{31}$ in series to earth. The home contact of the bank ZRU2 is connected through relay contacts RQ2 to earth.

The bank ZRU3 has ten bank contacts which are connected to ten terminals $Tu_0$ to $Tu_9$ respectively. The wiper of the bank ZRU3 is connected through a resistor $R_{40}$ to the fixed contact of contacts CD1.

A uniselector ZRD has three banks ZRD1, ZRD2 and ZRD3, each of which has a home contact and bank contacts. The bank ZRD1 has ten bank contacts which are connected to the translator 25. The wiper of ZRD1 is connected through a resistor $R_{41}$ to the control grid of a gas-filled triode $V_{30}$ whose cathode is connected to earth through a bias source $GB_{15}$. The anode of the valve $V_{30}$ is connected through relay contacts UA1 to one terminal of a relay winding UA one other terminal of the winding UA is connected through the relay contacts RQ1 and RB2 to the terminal $HT+15$.

The bank ZRD2 is a homing bank and the homing arc $BC_7$ is connected through relay contacts UA2 to earth, and the home contacts RQ2 to earth. The wiper of the bank ZRD2 is connected through the mechanically operated contact ZRD$dm$, the operating winding ZRD, the relay winding CD in the battery $BAT_{31}$ in series to earth.

The bank ZRD3 has ten bank contacts which are connected to ten terminals $Td_0$ to $Td_9$ respectively. The wiper of the bank ZRD3 is connected through a rectifier $W_{20}$ to the fixed contact of contacts CD1.

The moving contact of the contact CD1 in addition to being connected through the capacitors $C_{26}$ and $C_{29}$ to the suppressor grids of the pentodes $V_{24}$ and $V_{25}$ respectively is connected through a resistor $R_{42}$ to earth and directly to the moving contact of contact RD1. The fixed contact of contacts RD1 is connected through a resistor $R_{43}$ to earth and through a capacitor $C_{33}$ to the control grid of a triode valve $V_{31}$ whose cathode is earthed. Negative bias is applied through a resistor $R_{44}$ to the control grid of the triode $V_{31}$ from the negative terminal $-GB_{16}$ of a bias source (not shown) whose positive terminal is earthed. The anode of the valve $V_{31}$ is connected through a capacitor $C_{34}$ to an output terminal $ASP_1$, and through a resistor $R_{45}$ to the positive terminal $HT+16$ of a source (not shown) of D. C. whose negative terminal is earthed.

The translator 25 is connected through relay contacts RQ3 to the positive terminal $HT+17$ of a source (not shown) of D. C. whose negative terminal is earthed. Ten terminals $Tu'_0$ to $Tu'_9$ and ten terminals $Td'_0$ to $Td'_9$ are connected to the translator and a further terminal $CS_2$ which is connected to the CS terminals in the sub's line circuits (see Fig. 2).

Figure 9:
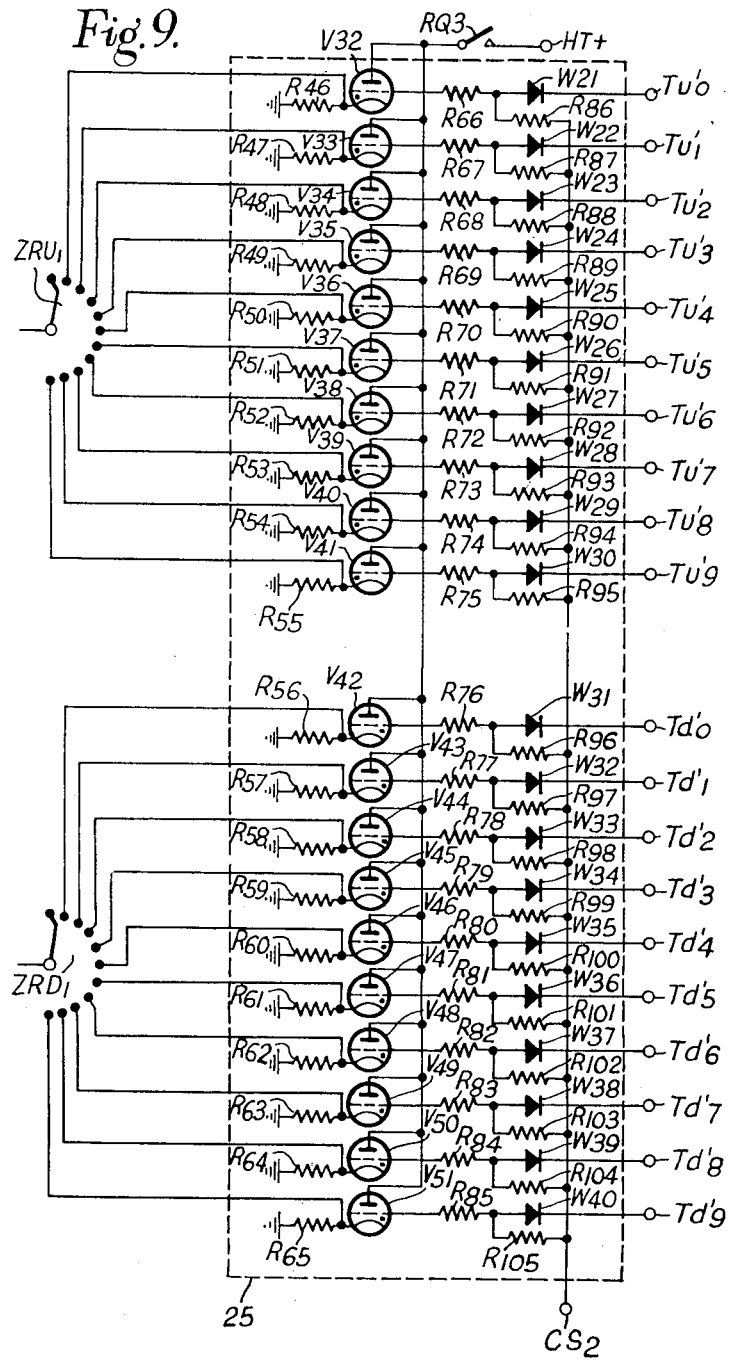

Referring now to Fig. 9 this is a theoretical circuit diagram of the translator 25. The translator comprises two groups of gas-filled triode valves each group containing ten valves. A first of the groups contains ten triodes $V_{32}$ to $V_{41}$ whose cathodes are connected to earth through resistors $R_{46}$ to $R_{55}$ respectively, and directly to the ten bank contacts respectively of the uniselector bank $ZRU_1$. The anodes of the triodes $V_{32}$ to $V_{41}$ are connected together and through the relay contacts $RQ_3$ to the terminal $HT+17$. The terminals $Tu'_0$ to $Tu'_9$ are connected through ten rectifiers $W_{21}$ to $W_{30}$ and ten resistors $R_{66}$ to $R_{75}$ respectively to the control grids of the triodes $V_{32}$ to $V_{41}$. The terminal $CS_2$ is connected through ten resistors $R_{86}$ to $R_{95}$ to the junctions of the rectifiers and resistors connecting the terminals $Tu'_0$ to $Tu'_9$ respectively to the control grids of the triodes $V_{32}$ to $V_{41}$.

The second group contains ten triodes $V_{42}$ to $V_{51}$ whose cathodes are earthed through resistors $R_{56}$ to $R_{65}$ respectively. The cathodes of these valves are also connected directly to the ten bank contacts respectively of the uniselector bank $ZRD_1$. The anodes of the valves $V_{42}$ to $V_{51}$ are connected together and through the relay contacts $RQ_3$ to the terminal $HT+17$. The terminals $Td'_0$ to $Td'_9$ are connected through ten rectifiers $W_{31}$ to $W_{40}$ and ten resistors $R_{76}$ to $R_{85}$ to the control grids of the valves $V_{42}$ to $V_{51}$ respectively. The terminal $CS_2$ is connected through ten resistors $R_{96}$ to $R_{105}$ to the junctions respectively of the rectifiers and resistors connecting the terminals $Td'_0$ to $Td'_9$ to the control grids of the valves $V_{42}$ to $V_{51}$ respectively.

Figure 10:
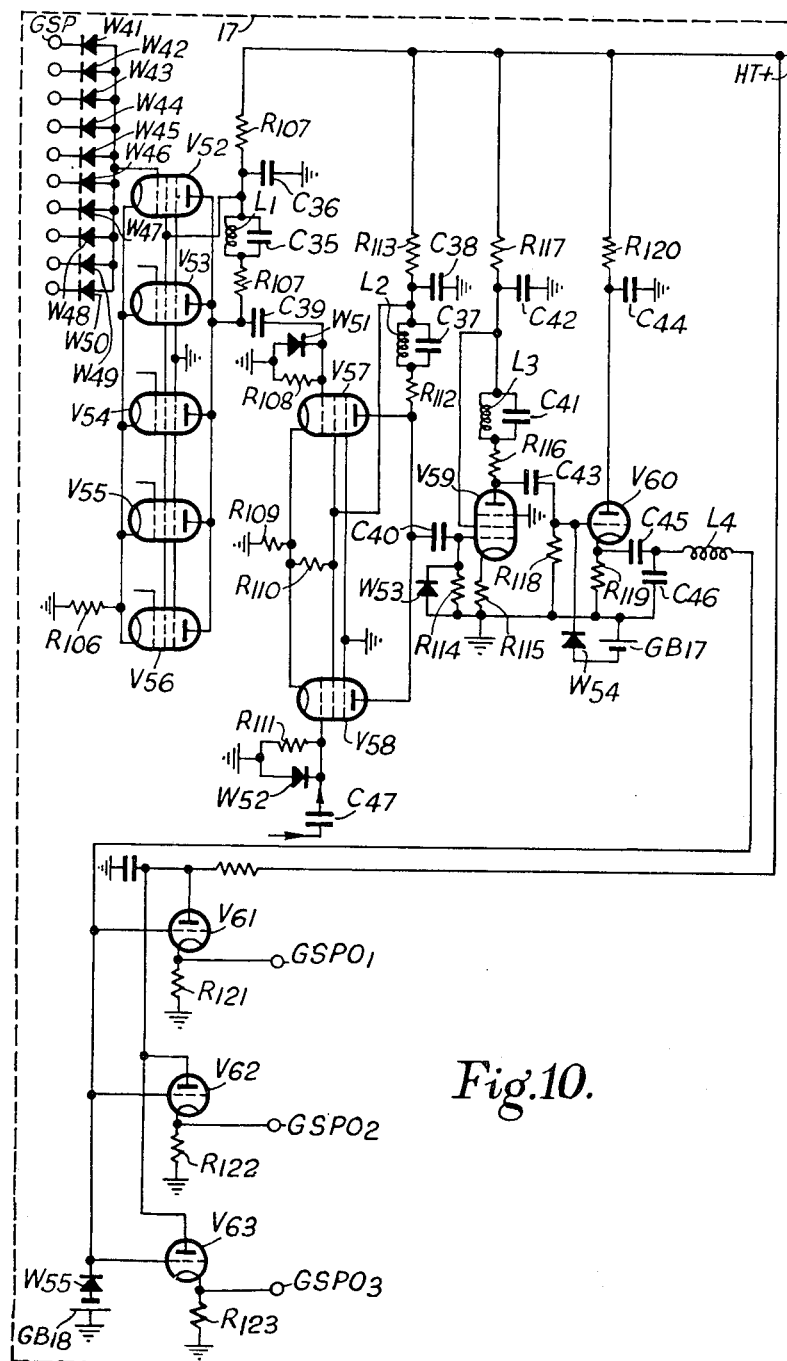

Referring now to Fig. 10 this is a circuit diagram of an arrangement suitable for use as the GO speech junctions 17 of Fig. 1. The output terminals $GSP_1$ to $GSP_{100}$ of the 100 calling units respectively (see $GSP_1$ of Fig. 3) are connected to input terminals $GSP_1$ to $GSP_{100}$ of the arrangement of Fig. 10. In Fig. 10 only $GSP_1$ to $GSP_{10}$ are shown. The input terminals $GSP_1$ to $GSP_{100}$ are grouped into ten groups of ten terminals each and the ten groups are connected to the control grids of ten pentodes of which five are shown at $V_{52}$ to $V_{56}$. The terminals $GSP_1$ to $GSP_{10}$ are connected through rectifiers $W_{41}$ to $W_{50}$ respectively to the control grid of the pentode $V_{52}$. The other nine groups of input terminals are connected in a like manner to the control grids of the other nine input pentodes respectively. The five pentodes $V_{52}$ to $V_{56}$ have a common cathode resistor $R_{106}$, and the cathodes of the other five input pentodes (not shown) are likewise provided with a common cathode resistor. The anodes of the five input pentodes $V_{52}$ to $V_{56}$ are connected together as shown and have a common wide band anode load comprising a resistor $R_{107}$, an inductor $L_1$ and a capacitor $C_{35}$. A resistor $R_{107}$ and a capacitor $C_{36}$ are for decoupling purposes. The anode connections of the other five input pentodes are the same as those shown for the pentodes $V_{52}$ to $V_{56}$.

The common anode connection of the five pentodes $V_{52}$ to $V_{56}$ is connected through a capacitor $C_{39}$ to the control grid of a pentode valve $V_{57}$. The common anode connection of the other five input pentodes (not shown) is connected through a capacitor $C_{47}$ to the control grid of a pentode valve $V_{58}$. The control grid of the pentode $V_{57}$ is connected to earth through a rectifier $W_{51}$ and a resistor $R_{108}$ in parallel, and the control grid of the pentode $V_{58}$ is connected to earth through a rectifier $W_{52}$ and a resistor $R_{111}$ in parallel. The screen grids of the two pentodes $V_{57}$ and $V_{58}$ are connected together and through a resistor $R_{110}$ to the common cathode connection of the two pentodes $V_{57}$ and $V_{58}$. The suppressor grids of these two pentodes are earthed.

The anodes of the two pentodes $V_{57}$ and $V_{58}$ are connected together and have a common wide band load comprising a resistor $R_{112}$ an inductor $L_2$ and a capacitor $C_{37}$. A resistor $R_{113}$ and a capacitor $C_{38}$ are for decoupling purposes, and the junction of $R_{113}$ and $C_{38}$ is connected to the screen grids of the two pentodes $V_{57}$ and $V_{58}$.

The anodes of the two pentodes $V_{57}$ and $V_{58}$ are connected through a capacitor $C_{40}$ to the control grid of a pentode valve $V_{59}$. The control grid of this valve is also connected to earth through a rectifier $W_{53}$ and a resistor $R_{114}$ in parallel. The cathode of the pentode valve $V_{59}$ is connected to earth through a resistor $R_{115}$ and the anode has a wide band load comprising a resistor $R_{116}$ an inductor $L_3$ and a capacitor $C_{41}$. A resistor $R_{117}$ and a capacitor $C_{42}$ are for decoupling purposes. The junction of $R_{117}$ and $C_{42}$ is connected to the screen grid of the valve $V_{59}$ and the suppressor grid of the valve $V_{59}$ is earthed.

The anode of the valve $V_{59}$ is connected through a capacitor $C_{43}$ to the control grid of a triode valve $V_{60}$, the control grid also being connected to earth through a resistor $R_{118}$ and in parallel therewith a rectifier $W_{54}$ and bias source $GB_{17}$ connected in series. The valve $V_{60}$ has a cathode load resistor $R_{119}$ and the anode thereof is decoupled by means of a resistor $R_{120}$ and a capacitor $C_{44}$. The load resistor $R_{119}$ is coupled by means of a wide band coupling comprising two capacitors $C_{45}$ and $C_{46}$ and an inductor $L_4$ to the control grids of three cathode follower valves $V_{61}$ and $V_{63}$. The control grids of these valves are also connected to earth through a rectifier $W_{55}$ and bias source $GB_{18}$. The valves $V_{61}$ to $V_{63}$ have cathode load resistors $R_{121}$ to $R_{123}$ respectively and the cathodes are connected to output terminals $GSPO_1$ to $GSPO_3$ respectively.

Although three cathode followers $V_{61}$ to $V_{63}$ have been shown more may be used if desired.

An arrangement as shown in Fig. 10 may also be used as the Return speech junction 18 and as the metering and release junction 19 of Fig. 1. When used as the Return speech junction the terminals $GSP_1$ to $GSP_{100}$ are replaced by the terminals $RSP_1$ to $RSP_{100}$ (see $RSP_2$, Fig. 8), and the terminals $GSPO_1$ to $GSPO_3$ are replaced by the terminals $RSPO_1$ to $RSPO_3$ (see $RSPO_1$, Fig. 3). When the arrangement of Fig. 10 is used as the metering and release junction the terminals $GSP_1$ to $GSP_{100}$ are replaced by the terminals $ASP_1$ to $ASP_{100}$ (see $ASP_1$, Fig. 8) and the terminals $GSPO_1$ to $GSPO_3$ are replaced by terminals $ASPO_1$ to $ASPO_3$ (see $ASPO_1$, Fig. 3).

Figure 11:
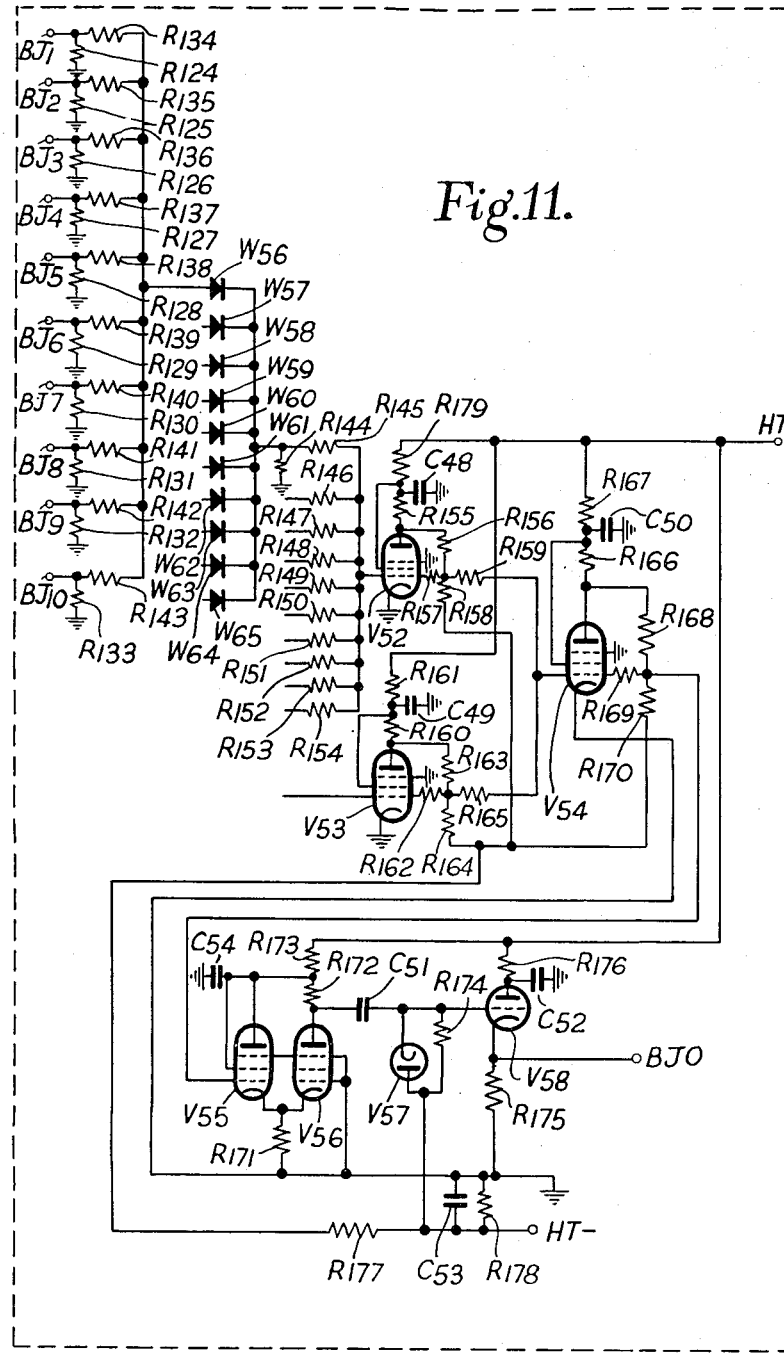

Referring now to Fig. 11 this is a circuit diagram of part of the busy junction 20 of Fig. 1. The 2,000 input terminals to the busy junction are grouped in groups of ten and of the 200 groups one is shown at $BJ_1$ to $BJ_{10}$ in the figure. These 2,000 terminals are connected to the terminals BJ in the 2,000 sub's line circuits respectively (see $BJ_1$ in Fig. 2).

Pulses appearing at the terminals $BJ_1$ to $BJ_{10}$ are combined through resistors $R_{124}$ to $R_{143}$. The combined outputs of the 200 groups are combined in further groups of ten by means of rectifiers the rectifiers of one group being shown at $W_{56}$ to $W_{65}$. The outputs of these 20 groups are combined in two further groups of ten each by means of resistors and a see-saw circuit. One of these groups of resistors is shown at $R_{145}$ to $R_{154}$ which are connected to the control grid of a pentode valve $V_{52}$ connected in a see-saw circuit comprising resistors $R_{155}$, $R_{156}$ and $R_{157}$. The see-saw circuit functions as described in the M. I. T. Radiation Laboratory Series, vol. 19, chapter 2, section 5, 27 et seq., Fig. 2.12(a) published by the McGraw-Hill Book Company Inc. A resistor $R_{179}$ and a capacitor $C_{48}$ are for decoupling the anode circuit of the valve $V_{52}$. The cathode and suppressor grid of this valve are connected to earth, the screen grid to the junction of $R_{179}$ and $C_{48}$, and negative bias for the control grid is supplied from a bias battery through resistors $R_{177}$ and $R_{158}$. The gain of the see-saw circuit is made substantially unity by appropriate selection of the valves of the resistors in the circuit.

The second see-saw circuit comprises a pentode valve $V_{53}$ connected in a circuit identical with that associated with the valve $V_{52}$, and comprising resistors $R_{160}$ to $R_{164}$ and a capacitor $C_{49}$.

The outputs of the two valves $V_{52}$ and $V_{53}$ are combined through two resistors $R_{159}$ and $R_{165}$ and applied to the control grid of a pentode valve $V_{54}$ connected in a further see-saw circuit. The cathode of the pentode is earthed and the anode is coupled to the control grid by means of resistors $R_{166}$, $R_{168}$, $R_{169}$ and $R_{170}$. A resistor $R_{167}$ and a capacitor $C_{50}$ serve to decouple the anode circuit of the valve $V_{54}$.

The junction of the resistors $R_{168}$ to $R_{170}$ is connected to the control grid of a pentode valve $V_{55}$ which is coupled to a further pentode valve $V_{56}$ by means of a resistor $R_{171}$ which is common to the cathodes of both valves $V_{55}$ and $V_{56}$.

The anode circuit of the valve $V_{56}$ contains an anode load resistor $R_{172}$ and is decoupled by means of a resistor $R_{173}$ and capacitor $C_{54}$. The suppressor grids of the valves $V_{55}$ and $V_{56}$ are earthed and their screen grids are connected to the junction of $R_{173}$ with $C_{54}$.

A capacitor $C_{51}$ serves to connect the anode of the valve $V_{56}$ to the control grid of a triode $V_{58}$. D. C. restoration of the voltages applied to the control grid of the valve $V_{58}$ is effected by a diode valve $V_{57}$ and a resistor $R_{174}$. The triode $V_{58}$ has a cathode load $R_{175}$ and acts as a cathode follower the cathode being connected to an output terminal BJO. This terminal is connected to the terminal of like reference in each register (see Fig. 5).

A suitable high frequency pulse generator (14 of Fig. 1) will now be described with reference to Fig. 12(a) to (e). In Fig. 12(a) the output of an oscillator $OS_1$ is applied to a ringing circuit comprising a pentode valve $V_{59}$ whose anode circuit includes the primary winding of a transformer $XF_4$. The secondary winding of the transformer $XF_4$ has a centre tap connected to earth through a resistor $R_{181}$ which is decoupled by a capacitor $C_{54}$. The lower end of the secondary winding is connected to the cathode of a diode valve $V_{60}$ whose anode is connected through a resistor $R_{182}$ to the positive terminal HT+18 of a source (not shown) of D. C. whose negative terminal is earthed. The anode of the diode $V_{60}$ is also connected directly to the control grid of a pentode valve $V_{61}$ whose cathode is connected to earth through a bias resistor $R_{183}$ which is decoupled by a capacitor $C_{55}$.

During the positive half cycles of the voltage at the cathode of the diode $V_{60}$ this diode is non-conducting. Thus the control grid of the valve $V_{61}$ becomes highly positive and anode current of high value flows in the anode circuit of the valve $V_{61}$.

During negative half-cycles of the voltage at the cathode of the diode $V_{60}$ this diode conducts and it is arranged that the voltage at the control grid of the valve $V_{61}$ falls below the value for anode current cut-off in the valve $V_{61}$. Thus the wave form of the voltage at the anode of the valve $V_{61}$ is substantially rectangular. The "mark-to-space ratio" of this wave form can be varied by changing the values of $R_{181}$ and $R_{183}$. A value of 4:1 is used.

The potential variations at the anode of the valve $V_{61}$ are applied through a cathode follower valve $V_{62}$ to a terminal TA.

A diode valve $V_{63}$ and two pentode valves $V_{64}$ and $V_{65}$ function in like manner to provide rectangular pulses of the same frequency but in anti-phase at a terminal TB.

The output of the valve $V_{65}$ is differentiated by a capacitor $C_{57}$ and resistor $R_{187}$ then applied through an inverter comprising a valve $V_{66}$ to a terminal TC.

In Fig. 12(b) the input terminal TC which corresponds to the terminal TC in Fig. 12(a) is coupled through two diode valves $V_{67}$ and $V_{68}$ to a multivibrator comprising two valves $V_{69}$ and $V_{70}$. The multivibrator functions in known manner as a frequency divider and provides a division ratio of 5:1. The output voltage of this multivibrator is fed through a cathode follower valve $V_{71}$ to an output terminal TD. The output applied to TD is also differentiated by a capacitor $C_{58}$ and resistor $R_{188}$ and applied to a phase inverter comprising a pentode valve $V_{72}$.

The output of this phase inverter is fed through two diodes $V_{73}$ and $V_{74}$ to a multivibrator comprising two pentodes $V_{75}$ and $V_{76}$. This multivibrator functions as a frequency divider and provides a division ratio of 2:1, and its output is applied through a phase splitter comprising a valve $V_{73}$ to two terminals TE and TF. The voltage applied to the terminal TF is also differentiated by a capacitor $C_{59}$ and resistor $R_{189}$ and applied through a phase inverter comprising a valve $V_{74}$, to a terminal TG.

In Fig. 12(c) the terminal TG, which corresponds to the terminal TG of Fig. 12(b) is connected to a further multivibrator $MV_1$ which functions as a frequency divider and provides a division ratio of 5:1. The output of $MV_1$ is applied through a cathode follower $CF_1$ to a terminal TH.

In Fig. 12(d) the terminal TD corresponds to the terminal TD of Fig. 12(b) and is connected to the input of a delay network $DL_1$ of known kind which has ten equally spaced taps $T_1$ to $T_{10}$ respectively and is terminated by a matched termination $R_{184}$. The delay of the network $DL_1$ is made equal to the recurrence period of the pulses applied at the terminal TD from the valve $V_{71}$ of Fig. 12(b), and the delay from the input to the first tap $T_1$ is made equal to the delay between adjacent taps.

The terminal TH in Fig. 12(d) corresponds to the terminal TH of Fig. 12(c) and is connected to the input end of a delay network $DL_2$ which has ten equally spaced taps $T_{11}$ to $T_{20}$. The delay of the network is made equal to the recurrence period of the pulses applied at TH and the delay from the input to the tap $T_{11}$ is made equal to the delay between adjacent taps. The network $DL_2$ is terminated by a matched termination $R_{185}$.

The pulse generator is provided with twenty output circuits of which one is shown in Fig. 12(e). In Fig. 12(e) an input terminal $T_1$ which corresponds to $T_1$ in Fig. 12(d) is connected to the control grid of a pentode $V_{74}$. An input terminal TA which corresponds to TA in Fig. 12(a) is connected to the suppressor grid of the pentode $V_{74}$. A cathode bias resistor $R_{186}$ decoupled by a capacitor $C_{56}$ provides bias for the pentode and by means of a diode $V_{75}$ the suppressor grid is kept normally at negative potential as a result of the D. C. restoration action of the diode in response to the positive-going pulses applied at the terminal TA. This negative potential on the suppressor grid is arranged to be sufficient to render the pentode $V_{74}$ normally non-conducting.

Thus the pentode $V_{74}$ acts as a gate and a pulse applied to the terminal $T_1$ passes through the gate only if a pulse is simultaneously applied to the terminal TA.

The output of the valve $V_{74}$ is applied through a phase inverter $V_{76}$ and a cathode follower $V_{77}$ to an output terminal $Tu_0$.

The other 19 output circuits are identical with that shown in Fig. 12(e) and their outputs appear at terminals $Tu_1$ to $Td_9$ respectively.

The terminal TA is also connected to the suppressor grids of the gates in the four output circuits connected to the terminals $Tu_2$, $Tu_4$, $Tu_6$ and $Tu_8$ and the terminals $T_3$, $T_5$, $T_7$ and $T_9$ are connected to the control grids of those four gates.

The terminal TB of Fig. 12(a) is connected to the suppressor grids of the gates in the five output circuits connected to the terminals $Tu_1$, $Tu_3$, $Tu_5$, $Tu_7$ and $Tu_9$ and the terminals $T_2$, $T_4$, $T_6$, $T_8$ and $T_{10}$ are connected to their control grids.

The terminal TE is connected to the suppressor grids of the gates of the five output circuits connected to the terminals $Td_0$, $Td_2$, $Td_4$, $Td_6$ and $Td_8$ and the terminals $T_{11}$, $T_{13}$, $T_{15}$, $T_{17}$ and $T_{19}$ are connected to the control grids thereof respectively.

The terminal TF of Fig. 12(d) is connected to the suppressor grids of the gates in the remaining five output circuits and the terminals $T_{12}$, $T_{14}$, $T_{16}$, $T_{18}$ and $T_{20}$ of Fig. 12(d) are connected to the control grids thereof respectively.

Thus the pulses appearing at the terminals $Td_0$ to $Td_1$ are as shown at $d_0$ to $d_9$ in Fig. 13, and the pulses appearing at the terminals $Tu_0$ to $Tu_1$ are as shown at $u_0$ to $u_9$ in Fig. 13.

The pulses $d_0$ to $d_9$ and $u_0$ to $u_9$ are combined in gates (of which two will be described later) to provide the 100 communication channels. For example the pulses $d_3$ are applied to open and close a gate to which the pulses $u_4$ are applied to provide channel No. 34. Only one of the $u_4$ pulses passes through this gate during each $d_3$ pulse as will be seen from an examination of Fig. 13. 100 $u$ pulses occur during each cycle of a $d$ pulse and the 100 $u$ pulses are gated by the $d$ pulses to provide the 100 channels.

The pulse width of the $u$ pulses, and hence the channel pulses, is arranged to be about 0.5 u. sec. and the recurrence frequency of the pulses in each channel is arranged to be about 8,000 per second.

Figure 14A:
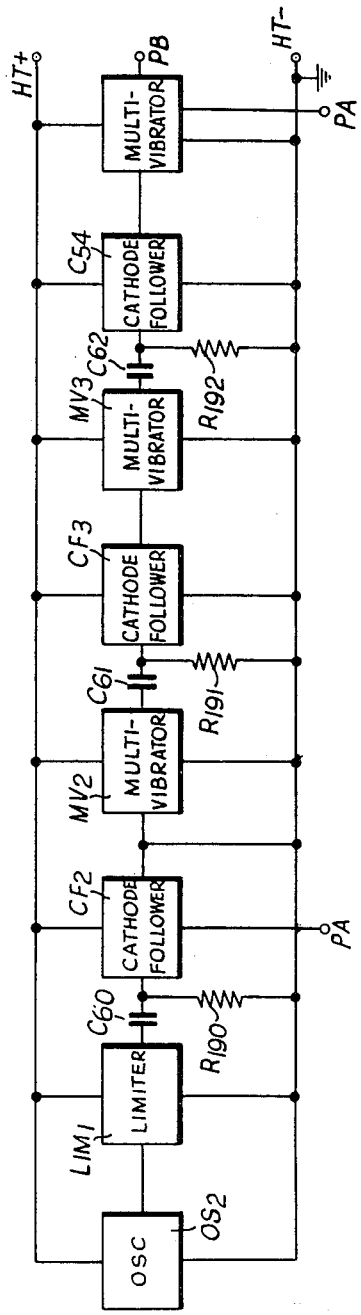
Figure 14C:
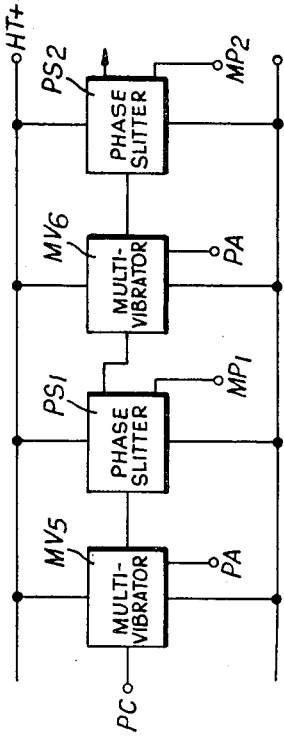
Figure 14B:
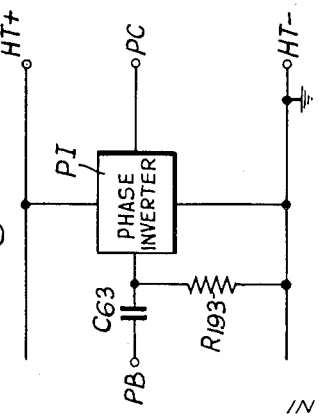

Referring now to Fig. 14 this is a schematic diagram of the low frequency pulse generator 21 of Fig. 1. In Fig. 14(a) a low frequency oscillator $OS_2$ is connected to a limiter $LIM_1$ which serves to produce square waves. These are differentiated by a capacitor $C_{60}$ and resistor $R_{190}$ and the differentiated voltage is passed to a cathode follower $CF_2$. This is biased so as to remove the negative-going portions of the differentiated voltage and to pass the positive-going portions to a terminal PA and to a multi-vibrator $MV_2$. The multivibrator $MV_2$ functions as a frequency divider of a division ratio of 2:1 and its output is differentiated by a capacitor $C_{61}$ and a resistor $R_{191}$. This differentiated voltage is applied through a cathode follower $CF_3$ to a multivibrator $MV_3$ which functions as a frequency divider of a division ratio of 5:1. The output of the multivibrator $MV_3$ is differentiated by a capacitor $C_{62}$ and resistor $R_{192}$ and passed through a cathode follower $CF_4$ to a multivibrator $MV_4$ which functions as a frequency divider of a division ratio of 7:1. The output of $MV_4$ is applied through a terminal PB to a differentiating circuit comprising a capacitor $C_{63}$ and a resistor $R_{193}$ in Fig. 14(b). The differentiated voltage appearing across the resistor $R_{193}$ is applied through a phase inverter PI to an output terminal PC. The terminals PA of Fig. 14(a) are connected together for the purpose of applying re-setting pulses to the multi-vibrator $MV_4$.

The pulses appearing at the terminal PC at a recurrence frequency $\frac{1}{70}$ of that of the pulses appearing at the terminal PA of Fig. 14(a) are applied to an arrangement of 70 bi-stable multivibrators (flip-flop circuits) of which two are shown in Fig. 14(c). The terminal PC in Fig. 14(c) is connected to a multivibrator $MV_5$ and each pulse appearing at the terminal PC operates the multivibrator $MV_5$. Re-setting pulses are applied to the multivibrator $MV_5$ from the terminal PA and hence the multi-vibrator $MV_5$ remains in its operated condition for only $\frac{1}{70}$ of the repetition period of the pulses applied at PC. The resulting pulse from the multivibrator $MV_5$ is passed through a phase splitter $SP_1$ to an output terminal $MP_1$ and to a second bi-stable multivibrator (flip-flop circuit) $MV_6$. Re-setting pulses for this multivibrator are also applied thereto from the terminal PA. The pulses from the multivibrator $MV_6$ are fed through a phase splitter $SP_2$ to an output terminal $MP_2$ and to the next multi-vibrator (not shown). The remaining multivibrators are arranged in the same way as those shown in Fig. 14(c) whereby a succession of 70 pulses are produced for each pulse applied to the terminal PC.

One succession of such pulses is represented in Fig. 15(a). The first ten pulses appear at terminals $MP_1$ to $MP_9$ and $MP_0$ respectively (Fig. 15(b)) of which $MP_1$ and $MP_2$ are shown in Fig. 14(c). The next ten pulses appear at terminals $CP_1$ to $CP_9$ and $CP_0$ respectively, the next ten at terminals $DP_1$ to $DP_9$ and $DP_0$ respectively, the next ten at terminals $UP_1$ to $UP_9$ and $UP_0$ respectively, the next ten at terminals $d'_1$ to $d'_9$ and $d'_0$ respectively and the next ten at terminals $u'_1$ to $u'_9$ and $u'_0$ respectively. The 66th pulse appears at a terminal CLP and the remainder are not used.

As explained in connection with the router (Fig. 6), the sub's line circuits are grouped in groups of ten. The terminals $UP_1$ to $UP_9$ and $UP_0$ of Fig. 15(b) are connected to the UP terminals of the ten sub's line circuits respectively of each group (see $UP_4$ of Fig. 2).

The terminals $MP_1$ to $MP_9$ and $MP_0$, $CP_1$ to $CP_9$ and $CP_0$, $DP_1$ to $DP_9$ and $DP_0$, $UP_1$ to $UP_9$ and $UP_0$ of Fig. 15(b) are connected to the terminals of like reference in Fig. 5. The terminals $MP_1$ to $MP_9$ and $MP_0$, $CP_1$ to $CP_9$ and $CP_0$ and $DP_1$ to $DP_9$ and $DP_0$ are connected to the terminals of like reference in Fig. 6. The terminal CLP of Fig. 15(b) is connected to the terminal CLP of Fig. 6. One of the terminals $Td'_1$ to $Td'_9$ and $Td'_0$ and one of the terminals $Tu'_1$ to $Tu'_9$ and $Tu'_0$ are connected to each calling unit (see $Td'_0$ and $Tu'_1$ of Fig. 3), different combinations of $Td'$ and $Tu'$ terminals being connected to different calling units. For example, $Td'_0$ and $Tu'_1$ are connected to the calling unit terminating channel No. 1 in the 100 channel communication arrangement (see Fig. 3). $Td'_3$ and $Tu'_6$ are connected to the calling unit terminating channel No. 36 and so on, the subscript in the $Td'$ reference representing the number of tens in the channel number and the subscript in the $Tu'$ reference representing the number of units in the channel number.

The terminals $Td'_1$ to $Td'_9$ and $Td'_0$, and the terminals $Tu'_1$ to $Tu'_9$ and $Tu'_0$ of Fig. 15(b) are also connected to the terminals of like reference respectively in the translator (Fig. 9).

It is arranged that each of the low frequency pulses is of about 150 milliseconds duration, and that the recurrence frequency, that is to say the recurrence frequency of the pulses appearing at each output terminal is about 50 P. P. S.

*Operation*

It will be assumed that the subscriber at the station 10 of Fig. 1 is calling the subscriber at the station 11 and that the number of the station 11 is 1464.

When the subscriber at the station 10 lifts his telephone handset from its rest a connection is automatically made from the terminal $LT_1$ of Fig. 2 through the subscriber's line and telephone set back to the terminal $LT_2$. Thus a circuit is completed from earth through the battery $BAT_1$ and the relay winding L back to earth. The relay therefore operates and its contacts L1 and L2 close.

These contacts complete the automatic stepping circuit for the uniselector S, this circuit being from earth through the battery $BAT_2$, the winding S, mechanically operated contacts $Sdm$, the relay contacts K4, the relay contacts L2, the wiper and home contact of the bank S3 and the contacts L1 back to earth. The uniselector commences to hunt.

Referring now to Fig. 3 (calling unit) it is arranged that when a calling unit is in use the terminal PO thereof ($PO_1$ in Fig. 3) is earthed through contacts B1 as will be described later. When, however, the calling unit is free the contacts B1 are open (as will be described later) and the earth is removed from the terminal PO thereof.

Referring again to Fig. 2, so long as the wiper of the bank S3 is passing over contacts connected to engaged calling units the automatic stepping circuit of the uniselector remains completed through the earthed terminals PO in those units. When, however, a contact connected to a free calling unit is reached the PO terminal thereof is not earthed and hence the automatic stepping circuit is broken and the motion of the wiper arrested.

The relay K is then energised through a circuit comprising the battery $BAT_2$, the winding S, the contacts $Sdm$, and the relay contacts L1. The resistance of the relay winding K is made sufficiently high to prevent further operation of the stepping circuit as a result of the current flowing in the circuit of the relay winding K.

Relay contacts K1 to K7 close. Contacts K1 and K2 connect the terminals $LT_1$ and $LT_2$ through to the uniselector banks S1 and S2. Assuming the wiper of the bank S3 to be arrested on contact $OP_1$, the wipers of S1 and S3 connect the terminals $LT_1$ and $LT_2$ to the terminals $+O_1$ and $-O_1$ respectively.

Whilst this is occurring the circuit in the seized calling unit operates to put an earth on the terminal $OP_1$ as will be described later.

When the relay contacts K1 and K2 close the relay winding L becomes de-energised and the relay contacts L1 and L2 open. The relay K remains operated however because of the earth applied to the terminal $OP_1$ by the seized calling unit.

The operation of the remainder of the circuit of Fig. 2 will be described later.

Referring now to Fig. 3, assuming this to be the seized calling unit current flows from earth through the left-hand winding of the relay windings A, through the relay contacts D1, through the calling subscriber's line, back through the relay contacts D2, through the right-hand winding A and through the battery $BAT_3$ to earth. Thus the relay A operates and its contacts A1 and A2 close.

The contacts A2 apply an earth to the cathode of the gas-filled triode $V_2$, and hence prepare this valve for later operation.

The contacts A1 complete the circuit of the relay winding B the circuit being from earth through the battery $BAT_9$ through the winding B and the contacts A1 to earth. The relay contacts B1 to B5 close. The contacts B1 apply an earth to the terminal $PO_1$. The contacts B2 prepare a circuit for transmitting subsequent dialling impulses to the terminal IMP. The contacts B3 connect the terminal $P_1$ to the contacts E3 and thence through the left-hand relay winding E to the negative terminal of the battery $BAT_6$. The contacts B4 put an earth on the busbar $BUS_1$. The contacts B5 connect the terminal GP to the suppressor grids of the two valves $V_4$ and $V_5$.

It is assumed that the seized calling unit terminates channel No. 1. The high-frequency pulses $d_0$ and $u_1$ (Fig. 13) are therefore applied to the calling unit at $Td_0$ and $Tu_1$ from the terminals of like reference in Fig. 12(c). The rectifier $W_{66}$ provides a low impedance path for all of each $d_0$ pulse applied to the terminal $Td_0$ except that part thereof which occurs during a $u_1$ pulse. The $u_1$ pulses render the rectifier non-conducting. Thus during the absence of the $u_1$ pulse the $d_0$ pulse applied to the terminal $Td_0$ is dropped across the resistor $R_{179}$. During each $u_1$ pulse coincident with a $d_0$ pulse, however, voltage is passed to the terminal GP.

The voltage pulses appearing at the terminal GP are arranged to be positive-going. The negative bias applied to the suppressor grids of the two pentodes $V_4$ and $V_5$ is arranged to be sufficient to render these two valves normally non-conducting. The amplitude of the voltage pulses applied to the suppressor grids of the two pentodes $V_4$ and $V_5$ from the terminal GP is arranged to be sufficient to overcome the bias and to render these two valves conducting. Thus the valves $V_4$ and $V_5$ are gated in channel No. 1, and unmodulated pulses in channel No. 1 are transmitted from the anode of $V_4$, through the capacitor $C_5$ to the terminal $GSP_1$.

The manner in which a register is allotted to the seized calling unit will now be described. An earth is applied to the terminal AL through the contacts B4, the busbar $BUS_1$, and the contacts E2.

Referring now to the register and calling unit finder circuit of Figure 5, whenever a register is free an earth is put on to the terminal R through the contacts $KF_6$, and a connection is made from earth through the battery $BAT_{17}$ and the contacts KF5 to the terminal Q.

Referring to the allotter circuit of Figure 4 the earth on the terminal AL from the seized calling unit completes the energising circuit of the relay ST through the battery $BAT_{11}$. Thus contacts ST1, ST2 and ST3 close. The automatic stepping circuit of the uniselector FD is completed from earth through the battery $BAT_{12}$, the winding FD, the mechanically operated contacts $FDdm$, and the contacts ST1, DK1 and ST3 to the earthed terminal R of a free register. Thus the uniselector commences to hunt.

The contacts ST2 connect the relay winding DK between the earthed terminal R and the wiper of the uniselector bank FD1. When the terminal Q of the free register is reached by the wiper of the bank FD1 the energising circuit of the winding DK is completed through the contacts KF5 (Figure 5) and the battery $BAT_{17}$.

The contacts DK1 operate and hence break the automatic stepping circuit of the uniselector FD, and complete the energising circuit of the relay winding DR from the earthed terminal R through the contacts ST3 and DK1, the winding DR and the battery $BAT_{13}$ to earth. Thus the contacts DR1 to DR4 close.

The contacts DR1 complete a circuit from earth, through the contacts DR1, the contacts FK1, the bank FD2, the terminal Y, the mechanically operated contacts $CUFdm$ (Figure 5), the operating winding CUF and the battery $BAT_{15}$ to earth. Thus the uniselector CUF of Figure 5 commences to hunt.

When the wiper of the bank CUF5 reaches the terminal $P_1$ connected to the terminal of the same reference in the seized calling unit (Figure 3) a circuit is completed from earth through the battery $BAT_6$ (Figure 3), the left-hand winding of the relay E, the contacts E3 and B3, the terminal $P_1$, the uniselector bank CUF5 (Figure 5) the terminal $P_2$, the uniselector bank FD3 (Figure 4) the contacts DR2 and the left-hand winding of the relay FK. Thus the relay E of Figure 3 and the relay FK of Figure 4 are energised. The contacts FK1 in Figure 4 also complete a circuit from earth through the battery $BAT_{14}$, the right-hand winding of relay FK, the contacts FK1 and DR1 to earth. This circuit holds the relay FK energised until released as will be described later.

In Figure 4 the contacts FK1 and FK2 close. The contacts FK1 complete a circuit from earth through the contacts DR1, FK1 and DR3, the uniselector bank FD4, the terminal X, the relay winding KF (Figure 5) and a battery $BAT_{18}$ to earth. Thus the relay KF of Figure 5 is energised. The opening of the contacts KF2 arrests the motion of the wipers of the uniselector CUF, the earth having already been removed from the terminal Y by the operation of the contacts FK1 of Figure 4. The contacts KF5 (Figure 5) disconnect the battery $BAT_{17}$ from the terminal Q. The contacts KF6 remove the earth from the terminal R and earth the terminals $P_2$ and $P_1$. The contacts KF3 remove the earth from the homing arc of the uniselector bank ZZ2, and the contacts KF4 prepare an earth for the contacts PQ3.

When the earth is removed from the terminal R (Figure 5) and the battery $BAT_{17}$ disconnected from the terminal Q by operation of the relay KF the relay DK of Figure 4 is released. The operation of the contacts DK1 releases the relay DR and the contacts DR1 opening break the energising circuit of the right-hand winding of the relay FK. Referring to Figure 3, when the relay E is energised as previously described the contacts E1 are arranged to close before any other contacts of this relay. A holding circuit is then completed from earth through the contacts B4, the contacts E1, the right-hand winding of the relay E, and the battery $BAT_5$ to earth. Operation of the contacts E3 earths the terminals $P_1$ and hence releases the relay FK of Figure 4. Contacts E2 open and remove the earth from the terminal AL. The allotter is, therefore, released and the wipers thereof home to their home contacts.

Until the allotter is released the contacts FK2 and DR4 (Figure 4) serve to hold the uniselector FD.

Referring to Figure 3 the contacts E4 complete a circuit from earth through the contacts A1, E4 and D5 to the terminal HO. The terminal HO of Figure 5 is connected through the uniselector bank CUF4, through the relay winding H and the battery $BAT_{32}$ to earth. The relay H is therefore operated. The contacts H1 to H8 close and the contacts H2 serve to hold the relay winding KF energised, and hence to hold the register connected to the seized calling unit.

The contacts E5 (Figure 3) connect the charged capacitor $C_{12}$ to the control grid of the valve $V_2$ which, therefore, strikes and energises the relay winding F. The contacts F1 close and hence dialling tone is fed to the calling subscribers line through the windings of the relay A.

The contacts E6 connect the terminals $Td'_0$ and $Tu'_1$ to the terminal $Rd'u'$. The low frequency pulses $d'_0$ and $u'_1$ are applied to the terminals $Td'_0$ and $Tu'_1$ respectively and hence appear at the terminal $Rd'u'$.

When the calling subscriber dials the number he requires (1464 in this example) the dialling impulses operate the relay A and hence the contacts A1.

The relay H of Figure 5 is slow acting and hence is not affected by the rapid operation of the contacts A1 of Figure 3. The contacts H1 connect the terminal IMP through the uniselector bank CUF1, the relay winding AA and the battery $BAT_{16}$ to earth. Thus the operation of the contacts A1 of Figure 3 is followed by the contacts AA1 of Figure 5. The contacts H7 earth the moving contact of the contacts AA1 and hence each time the contacts AA1 are closed by a dialling impulse of the first digit a circuit is made from earth through the contacts H7, AA1 and PQ1, the wiper of the uniselector bank ZZ1, the first bank contact of ZZ1, the operating winding M and the battery $BAT_{20}$ to earth. Thus in the present example where the number of impulses in the first digit is one the wiper on the uniselector bank M1 is set to the first bank contact and hence is connected to the terminal $MP_1$.

The relay BB is slow operating and its contacts BB1 close and open only once for each digit dialled irrespective of the number of impulses in the digit the energising circuit for the winding BB being from earth through the contacts H7 and AA1, the winding BB and the battery $BAT_{25}$ to earth. Thus when the first digit of the wanted number is being dialled the relay contacts BB1 close and remain closed until the dialling impulses for that digit end. The contacts BB1 then open and as a result the wiper of the uniselector bank ZZ1 moves to its second contact.

The dialling impulses of the next digit (4 in this example) are therefore applied to actuate the operating winding of the uniselector C. The wiper of the bank C1 is, therefore, connected through to the terminal $CP_4$. Likewise the dialling impulses of the third and fourth digits dialled (6 and 4 in this example) are applied to actuate the operating windings of the uniselectors D and U respectively and hence the wipers of the banks D1 and U1 are connected through to the terminals $DP_6$ and $UP_4$ respectively.

The pulses $M_1$ to $M_9$ and $M_0$ generated by the low frequency pulse generator of Fig. 14 are applied to the terminals $MP_1$ to $MP_9$ and $MP_0$ respectively of Fig. 5. Likewise the pulses $C_1$ to $C_9$ and $C_0$ are applied to the terminals $CP_1$ to $CP_9$ and $CP_0$ respectively, the pulses $D_1$ to $D_9$ and $D_0$ are applied to the terminals $DP_1$ to $DP_9$ and $DP_0$ respectively, and the pulses $U_1$ to $U_9$ and $U_0$ are applied to the terminals $UP_1$ to $UP_9$ and $UP_0$ respectively.

Thus the pulses $M_1$, $C_4$, $D_6$ and $U_4$ appear at the wipers of the four selector banks M1, C1, D1 and U1 respectively. These pulses are applied through the rectifiers $W_{10}$ to $W_{13}$ respectively to the output terminal RO and the pulses $d'_0$ and $u'_1$ are applied from the terminal $Rd'u'$ through the selector bank $CUF_2$ and the rectifier $W_9$ to the terminal RO. Thus the pulses appearing at the terminal RO are in recurring groups each group containing the pulses $M_1$, $C_4$, $D_6$, $U_4$, $d'_0$ and $u'_1$, in that order.

After the last digit is dialled the wiper of the bank ZZ1 steps on to the fifth bank contact and hence completes the energising circuit of the relay winding PQ. The contacts PQ1 open and isolate the contacts AA1 from the uniselectors M, C, D and U. The contacts $PQ_2$ and $PQ_4$ close and apply earths to the terminals PP and MM, and the contacts $PQ_3$ close and hold the winding PQ energised.

Referring now to the diagram of the router shown in Fig. 6. If the router is free, the relay winding RR is de-energised and hence the contacts RR1 are open and the contacts RR2 closed.

The automatic stepping circuit of the uniselector RF is therefore completed from the earthed terminal MM, through the contacts RR2, the mechanically operated contacts $RFdm$, the operating winding RF and the battery $BAT_{26}$ to earth. The uniselector hunts until the wiper of the bank RF2 reaches the bank contact connected to the earthed terminal PP. The circuit of the relay winding RR is then completed from the earthed terminal PP, through the bank RF2, through the winding RR and through the battery $BAT_{27}$ to earth. The contacts RR1 close connecting the terminal RO to the input of the router, and the contacts RR2 open thus breaking the stepping circuit of the uniselector RF2 and arresting the motion of the wipers.

The first $M_1$ pulse to arrive at the terminal RO after the relay contacts RR1 close, causes the gate $MG_1$ to be opened. This is effected as follows:

Referring to Fig. 7 the pulses $M_1$ are applied from the pulse generator of Fig. 14 to the terminal $MP_1$. The diode $V_{10}$ is arranged to be conducting in the absence of the $M_1$ pulses and to be insulating during each $M_1$ pulse. If, therefore pulses other than $M_1$ pulses appear at the input terminal of the gate $MG_1$, the diode $V_{10}$ is conducting thereto and hence no appreciable change of current takes place in the triode $V_{11}$. The charge in the capacitor $C_{16}$ is normally very low and the reactance of this capacitor is made low and hence the control grid of the triode $V_9$ is substantially short-circuited to earth through the valve $V_{13}$ and the capacitor $C_{16}$. Any pulses other than $M_1$ pulses do not, therefore, appreciably affect the anode current of the valve $V_9$.

When an $M_1$ pulse appears at the input of the gate, however, the diode $V_{10}$ is non-conducting thereto, the control grid of the valve $V_{11}$ is made positive by the $M_1$ pulse and hence the capacitor $C_{16}$ receives a charge, the upper plate in the drawing becoming positive. The cathode of the diode $V_{13}$ likewise becomes positive and this valve becomes non-conducting and hence the short-circuit from the control grid of the valve $V_9$ is removed. The valve $V_{12}$ is made non-conducing by the bias applied to its control grid and hence the charge in the capacitor $C_{16}$ is held and the diode $V_{13}$ remains non-conducting.

The next succeeding $C_4$ pulse appears, therefore, across the cathode load resistor $R_{21}$ and hence at the inputs of the C gates connected to the output of the gate $MG_1$. The gate $CG_4$ functions in like manner with respect to the $C_4$ pulses as the $M_1$ gate functions with respect to the $M_1$ pulses. Thus the next succeeding $D_6$ pulse appears at the inputs of the D gates connected to the output of the gate $CG_4$.

The D gates function in like manner to the M and C gates and hence the gate $DG_6$ is opened by the next succeeding $D_6$ pulse.

The remaining pulses of the group (pulses $U_4$, $d'$ and $u'_1$ in this example) pass therefore to the terminal $RT_{13}$.

Referring now to Fig. 2, and assuming this to be the line circuit of the called subscriber, the $U_4$ pulse is applied through the terminal RT and the resistor $R_1$ to the anode of the rectifier $W_2$. As the $U_4$ pulses generated by the low frequency generator (Fig. 14) are also applied at $UP_4$ the rectifier $W_2$ is made non-conducting for the duration of the $U_4$ pulse applied thereto from the terminal RT. This $U_4$ pulse passes therefore through the resistor $R_2$ to the control grid of the gas-filled triode $V_1$ and strikes this valve. The resulting anode current energises the relay Z and contacts $Z_1$ and $Z_2$ close.

The contacts $Z_1$ complete the energising circuit of the relay L and hence the relay contacts $L_1$ and $L_2$ close. The contacts $Z_2$ earth the contact $BC_2$ of the uniselector bank $S_5$.

The contacts $L_1$ complete a circuit from earth through the home contact and wiper of the uniselector control bank $S_3$, through the contacts $L_2$, $K_4$ and $Sdm$, the operating winding and the battery $BAT_2$ to earth. The uniselector S commences to hunt. The earth on the contact $BC_2$ of the bank $S_5$ ensures that the uniselector steps over the "Out" contacts on the banks $S_1$, $S_2$ and $S_3$ on to the "In" contacts.

Referring to Fig. 8 (called unit) when the called unit is free the terminal $PI_2$ is connected through the contacts $RB_3$, the relay winding RQ and the battery $BAT_{28}$ to earth, and hence the terminal $PI_2$ is of negative potential. When, however, the called unit is engaged the contacts $RB_3$ are closed (as will be described later) whereby the terminal $PI_2$ is earthed.

Thus, referring again to Fig. 2, the wiper of the bank $S_3$ supplies an earth for the automatic stepping circuit of the uniselector S so long as the wiper is passing over "In" contacts connected to engaged called units. When a contact is reached connected to a free called unit, however, the automatic stepping circuit is broken and the motion of the wipers arrested.

The relay K then becomes energised through $L_1$, the earth having been removed from the wiper of $S_3$ and hence from the contacts $K_4$. The contacts $K_1$ and $K_2$ connect the line terminals $LT_1$ and $LT_2$ to the seized called unit.

The contacts $K_3$ close and connect the winding K to the wiper of the bank $S_3$.

The contacts $K_4$ open and hence the moving contact of the contacts $K_4$ is disconneced from the moving contact of the contacts $L_2$ and from the wiper of the bank $S_5$.

The contacts $K_5$ open and extinguish the valve $V_1$ whereby the relay Z becomes de-energised. The contacts $Z_1$ open and de-energise the relay L. The contacts $L_1$ open and remove the direct earth from the relay winding K. The relays Z and L are, however, slow-operating and it is arranged that the earth from the seized called unit is applied to hold the relay K before the contacts $L_1$ open as will be described later. The contacts $L_2$ prepare a homing earth from the bank $S_4$ and the contacts $Z_2$ open and remove the earth from the contact $BC_2$ of the bank $S_5$.

The relay contacts $K_6$ connect the terminal RT to the terminal $BJ_1$ for a purpose to be described later, and the contacts $K_7$ connect the terminal RT through the uniselector bank $S_6$ to the terminal $CS_1$.

Referring back to the circuit of the router (Fig. 6) after each group of M, C, D, U, $d'$ and $u'$ pulses has passed therethrough all gates are closed by the application of a pulse to the terminal CLP from the low frequency pulse generator (Fig. 14). The M, C and D pulses of the next succeeding group reopen the appropriate gates to allow the U, $d'$ and $u'$ pulses to pass through again. This continues until the relay K of Fig. 2 closes when the next succeeding $d'$ and $u'$ pulses ($d'_0$ and $u'_1$ in this example) to arrive at the terminal RT are passed to the terminal $CS_1$.

As soon as the relay K operates, and whilst the relays Z and L are opening, the relay RQ of the seized called unit Fig. 8 becomes energised, the energising circuit being from earth through the winding RQ, the contacts $RB_3$, the uniselector bank $S_3$ of Fig. 2, the contacts $K_3$ and $L_1$ to earth. Thus the contacts $RQ_1$, $RQ_2$, and $RQ_3$ of Fig. 8 close, the contacts $RQ_1$ apply H. T. to the two valves $V_{28}$ and $V_{29}$. The contacts $RQ_2$ complete the automatic stepping circuits of the uniselectors ZRU and ZRD, and in addition complete the energising circuit of the relay CD. Thus the uniselectors ZRD and ZRU start the hunt, and whilst they are hunting the wipers of the banks $ZRD_3$ and $ZRU_3$ are isolated from the valves $V_{24}$, $V_{25}$ and $V_{31}$ by the opening of the contacts $CD_1$. The relay contacts $RQ_3$ apply H. T. to the translator 25.

Referring to Fig. 9 the $d'$ and $u'$ pulses arriving at the terminal $CS_2$ from the called subscriber's line circuit are applied to the control grids of the valves $U_{32}$ to $V_{51}$ through the resistors $R_{86}$ to $R_{105}$ respectively. The rectifiers $W_{21}$ to $W_{40}$ are, however, conducting to these pulses except the rectifiers to which $d'$ and $u'$ pulses are applied from the terminals $Tu'_0$ to $Td'_9$ simultaneously with the $d'$ and $u'$ pulses arriving at the terminal $CS_2$. In this example the pulses $d'_0$ and $u'_1$ appear at the terminal $CS_2$ simultaneously with the pulses $d'_0$ and $u'_1$ applied at the terminals $Td'_0$ and $Tu'_1$. Thus the rectifiers $W_{31}$ and $W_{22}$ are non-conducting in this example and permit the $d'_0$ and $u'_1$ pulses applied to the terminal $CS'_2$ to pass to the control grids of the valves $V_{42}$ and $V_{33}$ respectively. These two valves strike and hence their cathodes become positive.

When the wiper of the bank $ZRU_1$ reaches the bank contact connected to the cathode of the valve $V_{33}$ the positive potential appears at the control grid of the valve $V_{28}$ (Fig. 8) and this valve strikes. Similarly the valve $V_{29}$ (Fig. 8) strikes when the wiper of the bank $ZRD_1$ reaches the bank contact connected to the cathode of the valve $V_{42}$.

Referring to Fig. 8, when the valves $U_{28}$ and $V_{29}$ strike the relays DA and UA become energised by the anode circuits of these two valves. Thus the contacts $DA_1$, $DA_2$, $UA_1$, and $UA_2$ are operated. The contacts $DA_1$ hold the relay DA and extinguish the valve $V_{28}$ and the contacts $DA_2$ break the automatic stepping circuit of the uniselector ZRU. The contacts $UA_1$ hold the relay UA and extinguish the valve $V_{29}$, and the contacts $UA_2$ break the automatic stepping circuit of the uniselector ZRD.

Thus the wipers of the banks $ZRD_3$ and $ZRU_3$ are arrested on the bank contacts connected to the terminals $Td_0$ and $Tu_1$ respectively. The pulses $d_0$ and $u_1$ are applied to these terminals respectively from the high-frequency pulse generator. In the absence of a $d_0$ pulse the rectifier $W_{20}$ is conducting and hence the $u_1$ pulses are dropped across the resistor $R_{40}$. The occurrence of a $d_0$ pulse renders the rectifier $W_{20}$ non-conducting and hence the $u_1$ pulse occurring during each $d_0$ pulse passes to the contacts $CD_1$ that is to say pulses in channel No. 1. These contacts close simultaneously with the opening of the automatic stepping circuit of the selectors and the pulses in channel No. 1 pass to the suppressor grids of the valves $V_{24}$ and $V_{25}$.

Thus unmodulated pulses of anode current flow in the valves $V_{24}$ and $V_{25}$ which are arranged to be normally non-conducting by the bias applied thereto from the terminals $-GB_8$ and $-GB_{10}$ respectively. The pulses passed by the valve $V_{25}$ are applied through the capacitor $C_{28}$ to the control grid of the valve $V_{26}$. Thus, pulses of anode current flow in this valve which is arranged to be normally non-conducting by the bias applied thereto from the terminal $-GB_{11}$. Thus the relay RB becomes energised and the contacts $RB_1$ and $RB_4$ thereof are operated.

The contacts $RB_3$ put an earth on the terminal $PI_2$ and hence hold the relay K of Fig. 2 it being arranged that the contacts $RB_3$ close about ½ second before the contacts $L_1$ of Fig. 2 open. The contacts $RB_2$ close and hold the relays DA and UA when the relay RQ becomes de-energised on the operation of the contacts $RB_3$.

The contacts RB4 close and apply ringing voltage from the transformer XF$_3$ to the called subscriber's station. When the called subscriber answers the relay F becomes energised, the energising circuit being from earth through the battery BAT$_{33}$ the contacts F3, the called subscriber's line, the contacts F2, the relay winding F, the contacts RB4 and the secondary winding of the transformer XF3 back to earth. The contacts RB1 and F1 hold the relay F.

The relay RD then becomes energised, the energising circuit being from earth through the battery BAT$_{30}$, one winding of the relay RD, the contacts F3, the called subscriber's line, the contacts F2 and the other winding of the relay RD back to earth.

The contacts RD1 then apply the pulses in channel No. 1 through the valve V$_{31}$ to the terminal ASP$_1$ and thence through the metering and release junction (19, Fig. 1) to the terminal ASPO$_1$ of Fig. 3 (calling unit). The rectifier W$_7$ is rendered non-conducting thereby and permits the pulses in channel No. 1 from the terminal GP to appear at the control grid of the valve V$_6$. This valve then passes pulses of anode current through the relay winding D which becomes energised.

The contacts D1 and D2 operate and reverse the polarity of the terminals +O$_1$ and —O$_1$. This is for signalling purposes as described on page 278 of Telephony, vol. II by Atkinson. The contacts D4 apply a pulse of current to the terminal PO$_1$ from the battery BAT$_{10}$, the relay contacts J1 being operated after the contacts D4 on de-energisation of the slow operating relay J by the opening of the contacts D3.

The pulse of current applied to the terminal PO$_1$ operates the meter M of Fig. 2 to record the establishment of the call.

The contacts D5 (Fig. 3) open and hence remove the earth from the terminal HO. Thus the relay H of Fig. 5 becomes de-energised. The contacts H2 open and hence the relay KF is de-energised and thus the register is released and the uniselector CUF homes. The earths are removed from the contacts PP and MM and the router is released.

Speech voltages from the calling subscriber's station are transmitted through the transformer HY$_1$ to the control grid of the valve V$_4$ and there amplitude-modulate the pulses in channel No. 1 applied to the terminal GSP$_1$. These amplitude-modulated pulses pass through the "Go" speech junction to the called units.

Referring to Fig. 8 all pulses from the terminal GSPO$_1$ of the "Go" speech junction are passed to the control grid of the pentode V$_{25}$ which is gated by channel No. 1 pulses as previously described. Thus only the pulses in channel No. 1 pass to the transformer XF$_2$.

The primary winding is tuned by the capacitor C$_{30}$ to a periodicity of approximately twice the width of the pulses applied thereto from the valve V$_{25}$, and is heavily damped by the resistor R$_{194}$. The winding S$_2$XF$_2$ has more turns than the winding S$_2$XF$_1$ and hence provides a greater output voltage than S$_2$XF$_1$. The terminal —GB$_{13}$ is arranged to be about five volts less negative than the terminal —GB$_{12}$.

Assuming the charge in the capacitor C$_{31}$ to be such that the potential of the upper plate thereof in the drawing is between that of —GB$_{13}$ and —GB$_{12}$, the rectifiers W$_{16}$ to W$_{19}$ are non-conducting. When a pulse arrives at the primary winding of the transformer XF$_2$ from the valve V$_{25}$ the leading edge of the pulse shock excites the transformer. The first, and negative, half-cycle of the free oscillation is applied to the anode of W$_{16}$ which, therefore, remains non-conducting, and to the cathode of W$_{17}$ which becomes conducting and hence C$_{31}$ discharges through R$_{37}$ and W$_{17}$ until the potential of its upper plate in the drawing equals the potential of the terminal —GB$_{12}$. Any further negative excursion at the cathode of W$_{17}$ is damped by W$_{18}$. Simultaneously W$_{19}$ becomes conducting and as a result the capacitor C$_{31}$ discharges further and its upper plate is left at a potential somewhat below that of the terminal —GB$_{12}$.

Just as this negative half-cycle ends, the lagging edge of the pulse arrives and again the transformer XF$_2$ is shock-excited but this time in the opposite sense. The first, and positive, half-cycle of this second free oscillation has no effect on W$_{17}$ and W$_{18}$. The capacitor C$_{31}$ is charged, however, through W$_{16}$ to a value dependent upon the amplitude of the pulse applied to the transformer XF$_2$, and lying between the potentials of the terminals —GB$_{12}$ and —GB$_{13}$.

The damping provided by the resistor R$_{194}$ is arranged to be sufficient to prevent subsequent half-cycles from affecting the charge in the capacitor C$_{31}$.

Thus the capacitor C$_{31}$ presents relatively broad pulses to the valve V$_{27}$ in response to relatively narrow pulses passed by the valve V$_{25}$, the amplitude of the broad pulses being dependent upon the amplitude of the narrow pulses.

The broad amplitude-modulated pulses are demodulated by being passed through the low-pass filter FIL$_2$ and the speech voltages are passed through the transformer HY$_2$, the capaictors C$_{22}$ and C$_{23}$, the contacts F$_2$ and F$_3$, and the called subscriber's line circuit to the called subscriber's line.

Speech voltages from the called subscriber are passed through his line circuit, and the hybrid transformer HY$_2$ to the control grid of the pentode V$_{24}$. Here they serve to amplitude-modulate the pulses (in channel No. 1) applied from the anode of V$_{24}$ to the terminal RSP$_2$. These pulses are applied through the Return speech junction to the terminal RSPO$_1$ of Fig. 3 and thence to the control grid of the pentode V$_5$ which is gated by pulses in channel No. 1 applied to the suppressor grid from the terminal GP.

The transformer XF$_1$ in the anode circuit of the valve V$_5$, together with the capacitors C$_7$ and C$_{10}$, the resistors R$_7$ and R$_{195}$, and the rectifiers W$_3$ to W$_6$, function in the same manner as the transformer XF$_2$, capacitors C$_{30}$ and C$_{31}$, resistors R$_{37}$ and R$_{194}$, and rectifiers W$_{16}$ to W$_{19}$ of Fig. 8, to broaden the pulses passed by the valve V$_5$.

The broadened, amplitude-modulated pulses are passed through the valve V$_3$ and are demodulated by a low-pass filter FIL$_1$. The speech voltages are applied through the transformer HY$_1$ and the calling subscriber's line circuit to the calling subscriber's line.

The operation of the arrangement shown when a called subscriber is already engaged will now be described. When the called subscriber is engaged, the relay K in his line circuit (Fig. 2) is already energised and the terminal RT is connected through the relay contacts K6 to the terminal BJ$_1$. Thus the $d'$ and $u'$ pulses arriving at the terminal RT are transmitted to the terminal BJ$_1$ and thence through the Busy junction to the terminal BJO in the register (Fig. 5) allotted to the calling subscriber.

Thus these pulses coincide with the $d'$ and $u'$ pulses applied from the terminal R$d'u'$ to the rectifier W$_{14}$ which is rendered non-conducting thereby. Thus the $d'$ and $u'$ pulses applied to the terminal BJO pass through the capacitors C$_{13}$ and C$_{14}$ to the control grids of the valves V$_7$ and V$_8$. The $d'$ pulse serves to strike the valve V$_7$ whose cathode potential rises. The rise in potential at the cathode of the valve V$_7$ is transmitted to the control grid of the valve V$_8$ but is made insufficient to strike V$_8$. The $u'$ pulse applied to the control grid of V$_8$ is arranged to provide sufficient extra potential to strike V$_8$. The relay BR is, therefore, energised. The contacts BR1 close and hence earth the terminal BU$_1$. Referring to Fig. 3, when the terminal BU$_1$ is earthed the relay G becomes energised. The contacts G1 hold the relay G and the contacts G2 apply the busy tone to the calling subscriber line through the relay windings A and the calling subscriber's line circuit.

When a call is ended and the calling subscriber replaces his handset on its rest, the energising circuit for the relay A (Fig. 3) is broken. The relay contacts A1 return to the position shown thus de-energising the relay B. The contacts B1 remove the earth from the terminal PO1. Thus the relay K (Fig. 2) becomes de-energised, and the uniselector S homes. The calling unit is released and all relays return to their unoperated condition.

Thus the pulses arriving in channel No. 1 in this example at the terminal GSPO1 of Fig. 8 cease and hence the relay RB becomes de-energised. The contacts RB3 open, and the earth is removed from the terminal PI2. Thus the relay K in the called subscriber's line circuit is released and the uniselector in this line circuit homes. The contacts RB1 open and release the relay F (Fig. 8). The contacts RB2 open and release the relays DA and UA. Thus the contacts DA2 and UA2 close and the uniselectors ZRU and ZRD home. The called unit is then ready for use in making another call.

A second embodiment of the invention will now be described, in which the apparatus used differs only in some details from that already described.

The low frequency pulses required for use in the second embodiment are the M, C, D and U pulses as used in the first embodiment, and the gate closing pulses. In place of the $d'$ and $u'$ pulses, pulses of different durations and frequencies from the $d'$ and $u'$ are used. These pulses will be referred to as $d''$ and $u''$ pulses.

Referring to Fig. 16 this shows five groups of M, C, D and U pulses with four closing pulses CLP between these groups. The $u'$ pulses are replaced by $u''$ pulses of which $u''_1$ to $u''_5$ are shown. Each of the $u''$ pulses occupies an interval of time equal to that occupied by one group of M, C, D and U pulses. The $d''$ pulses occupy an interval of time equal to ten $u''$ pulses and a part of one $d''$ pulse $d''_1$ is shown in Fig. 16.

The high frequency pulse generator is the same as that used in the first embodiment.

The circuit of the calling unit remains as shown in Fig. 3 with the exception of the modification shown in Fig. 17. The interconnection of the terminals $Td'_0$, $Tu'_1$ and $Rd'u'$ becomes as shown in Fig. 17. The rectifier W67 and resistor R196 function in like manner to the rectifier W66 and resistor R179 associated with the terminals $Tu_1$ and $Td_0$ of Fig. 3. Thus the only $Tu''_1$ pulses to reach the terminal $Td''u''$ are those occurring during $Td''_0$ pulses.

The circuit of Fig. 5 is modified as shown in Fig. 18. The pulses appearing at the terminal $Rd''u''$ are applied to render the rectifier W9 non-conducting. In the absence of a pulse to render the rectifier W9 non-conducting the outputs from the wipers of the uniselector banks M1, C1, D1 and U1 are dropped across a resistor R197. Thus the only M, C, D and U pulses to reach the terminal RO are those which occur during the gating pulses applied to the terminal $Rd''u''$. These gating pulses are characteristic of the seized calling unit.

The router (Fig. 6) is modified by the removal of the relay RR and the uniselector RF. These are dispensed with in view of the fact that the registers are gated as just described and hence are connected to the router in turn automatically. The only pulses which appear at the output of the router are the U pulses, each U pulse occurring during an interval of time characteristic of the seized calling unit from which it is transmitted.

The called units are as shown in Fig. 8 but the pulses applied to the terminals $Tu'_0$ to $Td'_9$ of the translator are the pulses $u''_0$ to $d''_9$ instead of $u'_0$ to $d'_9$. In addition a circuit is provided to enable only one pulse to pass from the router to the terminal CS2, whilst a call is being set up. A suitable circuit for this purpose is described in copending United States patent application Serial No. 190,533 filed October 17, 1950.

Although arrangements have been described in which the communication channels are provided by interlaced pulse trains it will be understood that any form of communication channels may be used.

Numerous modifications and further embodiments of the invention will be apparent to those skilled in the art.

Certain features of the system shown and described but not claimed herein are shown, described and claimed in the following U. S. patent applications: Serial Nos. 247,073, filed September 18, 1951; 247,233, filed September 19, 1951; 271,534, filed February 14, 1952; 257,786, filed November 23, 1951; 257,991, filed November 24, 1951; 257,992, filed November 24, 1951; 258,548, filed November 28, 1951; and 269,158, filed January 31, 1952.

We claim:

1. An automatic exchange having a plurality of stations connected thereto each said station being terminated by line terminating equipment in said exchange and having means to transmit an initial calling signal to the exchange to render the exchange responsive to subsequent dialling signals from the station for making a connection with a second station, said exchange including a plurality of communication channels, and said line terminating apparatus comprising selector apparatus to select a free one of said channels, characterized in that said exchange includes means to provide signals identifying the said channels respectively, further selector apparatus by-passing said communication channels, means to apply said dialling signals to said further selector apparatus to select the line terminating equipment of the wanted station indicated by the dialling signals, means to apply the one of said identifying signals characteristic of the selected one of said free channels to said further selector apparatus for transmission to the line terminating equipment of the wanted station, final selector apparatus, and means to apply the last said identifying signal to the final selector apparatus to connect the last said line terminating equipment to the said one of the free communication channels.

2. An automatic exchange according to claim 1, wherein the further selector apparatus comprises register means to store said dialling signals, other selector apparatus to select said wanted station and connections to apply said stored signals to operate said other selector apparatus.

3. An automatic exchange according to claim 1 wherein the said communication channels are provided by interlaced pulse trains.

4. An automatic exchange according to claim 1 wherein the said communication channels are provided by interlaced pulse trains, and said channel identifying signals are provided by further interlaced pulse trains.

5. An automatic exchange having a plurality of stations connected thereto each said station being terminated by line terminating equipment in said exchange and having means to transmit an initial calling signal to the exchange to render the exchange responsive to subsequent dialling signals from said station for making a connection with a second station, said dialling signals constituting pulses which are representative of the number of the second station, characterized in that said exchange comprises a plurality of communication channels, said line terminating apparatus of each of said stations comprises a selector apparatus and connections to apply said initial calling signal to said selector apparatus to connect the station originating the initial calling signal to a free one of said channels, register means to store said subsequent dialling signals, connections to apply said dialling signals to said register means, means to generate channel identification signals characteristic of the several channels respectively, means to apply the channel identification signal characteristic of the selected free channel to said register means, apparatus in said register means to combine said stored dialling signals with said channel identification signal to produce a composite signal characteristic of the wanted station and the selected free channel, further selector apparatus, connections to apply said composite signal to said further selector apparatus to select the line terminating equipment of said wanted station and transmit a free channel identifying signal thereto, final selector apparatus, means connecting said selector apparatus to said channels and means for applying the last said free channel identifying signal thereto to connect the line terminating equipment of the wanted station to said free channel.

6. An automatic exchange according to claim 5, wherein said channel identifying signals are provided by interlaced recurring pulses of relatively low frequency means are provided in said register to reproduce said stored signals in the form of recurring groups of pulses of relatively high frequency and said apparatus to combine said stored dialling signals and said channel identification signal comprises a gate device, means to apply said recurring groups of pulses to the input of the gate device and means to apply the channel identification pulses characteristic of said free channel to control said gate device whereby said composite signal is in the form of a recurring group of pulses which occur only during the periods occupied by the pulses identifying the selected free one of said communication channels.

7. An automatic exchange for a plurality of subscriber stations, each of which has a handset on a rest and which handset when picked up renders effective means to transmit an initial calling signal, said exchange comprising a plurality of communication channels, a plurality of line terminating apparatuses at the exchange, each line terminating apparatus being associated with a different subscriber station, each line terminating apparatus including means responsive to an initial calling signal from its associated subscriber station when the latter has initiated a call to select a free one of said communication channels, routing apparatus by-passing said communication channels and responsive to dialling signals from the calling subscriber station to route to the line terminating apparatus of the called subscriber station an identification signal identifying a selected one of the channels, and further apparatus responsive to the channel identification signal to connect the called subscriber station to the selected channel.

8. An automatic exchange as set forth in claim 7 wherein means is included to release the routing apparatus before the call is terminated so that it is free for use in routing other calls.

9. In a communication system a plurality of lines terminating in an exchange, means providing a plurality of communication channels in said exchange available to any of said lines for carrying speech signals, and means for connecting a calling line with a free one of said channels, characterized by the provision of means providing a second plurality of communication channels bypassing the first said channels and extending to the line terminating apparatus of the said lines respectively, means responsive to a calling signal representative of the number of a called subscriber to select the one of the second plurality of communication channels which extends to the line terminating apparatus of the called subscriber and to transmit in the selected one of the second plurality of channels a signal identifying the selected free one of the said communication channels and further means responsive to the last said signal to connect the called subscriber's line terminating apparatus to the said free one of the first said plurality of communication channels.

References Cited in the file of this patent
UNITED STATES PATENTS

| | | |
|---|---|---|
| 2,203,557 | Wicks | June 4, 1940 |
| 2,261,370 | Hersey et al. | Nov. 4, 1941 |
| 2,293,588 | Cain et al. | Aug. 18, 1942 |
| 2,379,715 | Hubbard | July 3, 1945 |
| 2,506,613 | Ransom | May 9, 1950 |
| 2,559,603 | Derjavitch | July 10, 1951 |
| 2,570,274 | Ransom | Oct. 9, 1951 |
| 2,584,987 | Deloraine | Feb. 12, 1952 |
| 2,590,833 | Ransom | Apr. 1, 1952 |
| 2,619,548 | Lesti | Nov. 25, 1952 |